(12) United States Patent
Wozniak et al.

(10) Patent No.: US 11,922,368 B1
(45) Date of Patent: Mar. 5, 2024

(54) OBJECT CLASSIFICATION EXCEPTION HANDLING VIA MACHINE LEARNING

(71) Applicant: Amazon Technologies, Inc., Seattle, WA (US)

(72) Inventors: Amanda V. Wozniak, Somerville, MA (US); David Paul Smart, Andover, MA (US)

(73) Assignee: Amazon Technologies, Inc., Seattle, WA (US)

( * ) Notice: Subject to any disclaimer, the term of this patent is extended or adjusted under 35 U.S.C. 154(b) by 234 days.

(21) Appl. No.: 17/119,055

(22) Filed: Dec. 11, 2020

(51) Int. Cl.
 *G06Q 10/087* (2023.01)
 *G06F 18/214* (2023.01)
 *G06N 20/20* (2019.01)

(52) U.S. Cl.
 CPC ......... *G06Q 10/087* (2013.01); *G06F 18/214* (2023.01); *G06N 20/20* (2019.01)

(58) Field of Classification Search
 CPC .. B65G 47/917; B65G 17/323; B65G 1/1376; B65B 21/00; B65B 23/00; G06Q 10/087; G06Q 10/08; B25J 9/00; B25J 13/00
 See application file for complete search history.

(56) References Cited

U.S. PATENT DOCUMENTS

| | | | | |
|---|---|---|---|---|
| 7,558,766 B1 * | 7/2009 | Forman | ............... | G06F 18/2115 706/20 |
| 8,317,032 B2 * | 11/2012 | Crezee | ..................... | B07C 5/38 209/555 |
| 10,373,116 B2 * | 8/2019 | Medina | ................ | G06Q 10/087 |
| 10,839,474 B2 * | 11/2020 | Lukka | ....................... | B25J 9/026 |
| 10,906,188 B1 * | 2/2021 | Sun | ......................... | B25J 19/023 |
| 11,392,133 B2 * | 7/2022 | Zheng | .................. | G06V 10/774 |
| 2010/0324729 A1 * | 12/2010 | Ruge | ....................... | B65G 47/90 700/245 |
| 2016/0350675 A1 * | 12/2016 | Laks | ....................... | G06N 20/00 |
| 2017/0061179 A1 * | 3/2017 | Delianski | ............ | G06K 7/10821 |
| 2019/0095852 A1 * | 3/2019 | Sanjay | ............... | G06K 7/10386 |
| 2019/0102667 A1 * | 4/2019 | Bashkirov | .............. | G06N 3/004 |
| 2019/0197396 A1 * | 6/2019 | Rajkumar | ................ | G06N 3/08 |
| 2020/0095001 A1 * | 3/2020 | Menon | .................... | B65B 57/14 |
| 2020/0098394 A1 * | 3/2020 | Levinson | ............... | G08G 1/165 |
| 2020/0130935 A1 * | 4/2020 | Wagner | ................ | B65G 1/1371 |
| 2020/0164517 A1 * | 5/2020 | Dick | ..................... | B25J 9/1697 |
| 2020/0218979 A1 * | 7/2020 | Kwon | ................. | G06F 18/2155 |

(Continued)

*Primary Examiner* — Florian M Zeender
*Assistant Examiner* — Vanessa Deligi
(74) *Attorney, Agent, or Firm* — Kilpatrick Townsend & Stockton LLP

(57) ABSTRACT

Techniques for classifying and processing physical objects are disclosed. In an example, a computer system may receive first data indicating that a first machine learning model of a robotic system is incapable to classify a physical object according to at least one of a set of predetermined classifications. The computer system may also receive second data corresponding to one or more attributes associated with the physical object. A second machine learning model of the computer system may determine a cluster of physical objects that includes an identifier of the physical object, whereby the identifier is included in the cluster based at least in part on the first data and a common attribute with other physical objects of the cluster. The computer system may then determine data for processing subsequent physical objects that are determined to have the common attribute.

20 Claims, 7 Drawing Sheets

(56) References Cited

U.S. PATENT DOCUMENTS

| | | | |
|---|---|---|---|
| 2020/0234071 A1* | 7/2020 | Yuvaraj | G06T 7/11 |
| 2020/0311956 A1* | 10/2020 | Choi | G06V 10/454 |
| 2020/0342259 A1* | 10/2020 | Jordan | G06F 18/285 |
| 2020/0361083 A1* | 11/2020 | Mousavian | B25J 9/1612 |
| 2021/0004017 A1* | 1/2021 | Colgate | G01C 21/3807 |
| 2021/0024297 A1* | 1/2021 | Sun | B65G 61/00 |
| 2021/0047132 A1* | 2/2021 | Sines | B65G 47/28 |
| 2021/0069898 A1* | 3/2021 | Duan | B25J 9/163 |
| 2021/0094184 A1* | 4/2021 | Gilchrist | B25J 13/088 |
| 2021/0138655 A1* | 5/2021 | Mousavian | B25J 9/161 |
| 2021/0146531 A1* | 5/2021 | Tremblay | G06N 20/00 |
| 2021/0158561 A1* | 5/2021 | Park | G06T 15/20 |
| 2021/0201077 A1* | 7/2021 | Lwowski | G06V 10/774 |
| 2021/0225327 A1* | 7/2021 | Matsumoto | G09G 3/3233 |
| 2021/0264225 A1* | 8/2021 | McCarson | G06F 18/24155 |
| 2021/0271920 A1* | 9/2021 | He | G06V 10/422 |
| 2021/0276185 A1* | 9/2021 | Shentu | B25J 9/1697 |
| 2021/0407090 A1* | 12/2021 | Li | G06T 7/10 |
| 2022/0048707 A1* | 2/2022 | Matl | B65G 47/917 |
| 2022/0126445 A1* | 4/2022 | Zhu | B25J 9/1635 |
| 2022/0277926 A1* | 9/2022 | Wang | H01J 37/3174 |
| 2022/0292708 A1* | 9/2022 | Ono | G06T 7/73 |

* cited by examiner

OBJECT CLASSIFICATION EXCEPTION HANDLING VIA MACHINE LEARNING

BACKGROUND

Modern inventory systems, such as those in mail order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory-related tasks become non-trivial. In inventory systems tasked with responding to large numbers of diverse inventory requests, inefficient utilization of system resources, including space, equipment, and manpower, can result in lower throughput, unacceptably long response times, an ever-increasing backlog of unfinished tasks, and, in general, poor system performance. For example, sometimes existing systems may fail to properly detect a particular type of package, which may delay processing times for packages of the particular type. Also, updating these systems to detect new package types may also be time and/or resource intensive.

BRIEF DESCRIPTION OF THE DRAWINGS

Various embodiments in accordance with the present disclosure will be described with reference to the drawings, in which.

DETAILED DESCRIPTION

Figure 1:
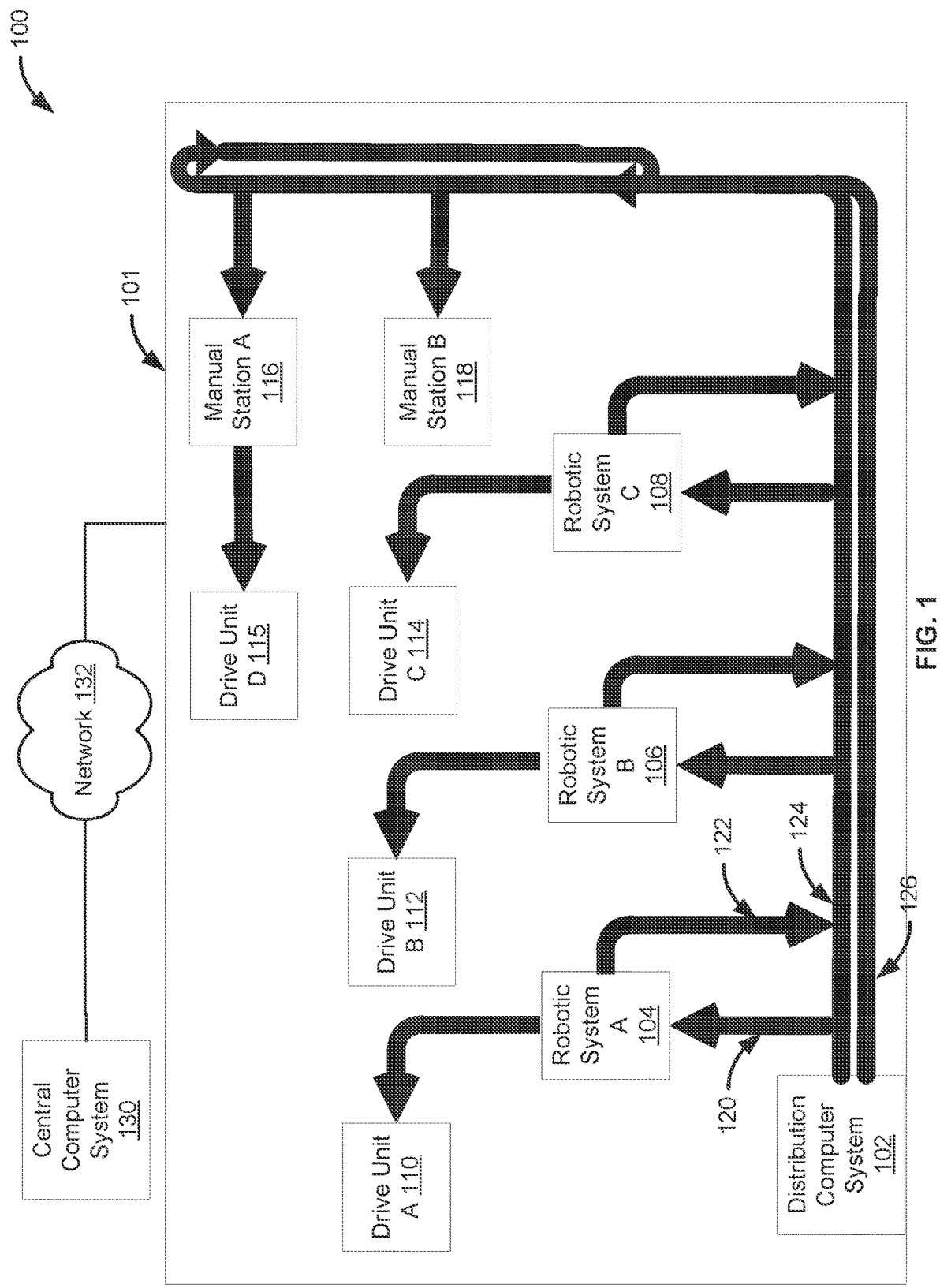
FIG. 1 illustrates an example of an inventory system including robot stations and a central station, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, improving techniques for classifying and processing physical objects. These techniques involve utilizing one or more machine learning techniques to efficiently analyze data that is generated by processing a first physical object, and then generating data (e.g., feedback data) for a feedback loop that is used to improve the processing of subsequent physical objects that have a common attribute as the first physical object. In an example, a central computer system of a fulfillment center receives first data from a robotic system that executes a first machine learning (ML) model (e.g., trained via a supervised learning process) to classify physical objects (e.g., packages) that are detected by a sensor of the robotic system. In one example, the robotic system may have a robotic arm, whereby the robotic arm picks up, scans, and or moves packages to different locations based in part on the classifications determined by the first ML model. In this example, the first data indicates that the first ML model is incapable to classify a particular physical object according to at least one of a set of predetermined classifications (e.g., incapable to classify a package type, a package segmentation within an image, etc.), and thus, the physical object is to be re-routed to another station (e.g., for manual processing). The central computer system also receives second data from the robotic system that corresponds to one or more attributes associated with the physical object. For example, the sensor (e.g., a camera) of the robotic system may capture an image of the physical object and then determine attributes of the physical object based at least in part on the image (e.g., one or more dimensions of the physical object, a color or marking on the physical object, etc.). The central computer system may then utilize a second ML model (e.g., utilizing an unsupervised learning process) to determine a cluster of physical objects that includes the physical object. The second ML model may include the physical object in the cluster (e.g., from among a plurality of other types of packages processed by the fulfillment center) based at least in part on: (I) the first data (e.g., indicating at least one classification exception associated with being incapable to classify the physical object), and (TI) a common attribute with other physical objects of the cluster that is one of the one or more attributes (e.g., of the second data) associated with the physical object. In this example, the other objects of the cluster may also have been incapable to be classified according to the at least one predetermined classification. The central computer system may then determine feedback data for processing subsequent physical objects that are determined to have the common attribute.

To further illustrate, and, continuing with the example introduced above, consider an example in which the fulfillment center includes a plurality of robotic systems that are connected to a central computer system (which may also be referred to herein as a "central station"). The fulfillment center may include a distribution computing system (which may also be referred to herein as a "distribution system"), which may be responsible for determining how to route packages, received into the fulfillment center, for further processing. For example, the distribution system may determine whether to route a physical object (e.g., a particular package, luggage, or a container for one or more packages) via a conveyor system (e.g., including a conveyor belt) to a first robotic system, a second robotic system, or direct the package to another path (e.g., a manual station for manual inspection and/or processing). In this example, using the first robotic system as a representative example, the distribution system may determine to route the physical object to the first robotic system. The first robotic system may utilize one or more sensors (e.g., one or more cameras, network devices, etc.) to detect data about the physical object. For example, the first robotic system may capture one or more images showing different portions of the physical object. Based on the images captured, the first robotic system may determine one or more attributes (e.g., features) of the object (e.g., dimensions of the physical object within the image, color, reflectivity, shape, etc.). The first robotic system may also determine a time (e.g., a time window) in which the package was detected and/or processed (e.g., manipulated) by the first robotic system.

In this example, a first ML model of the first robotic system may have been previously trained by another system (e.g., the central station, which may exist on-premise or off-premise (e.g., in a cloud computing environment) and then deployed to the first robotic system. As described further herein, the central station may be responsible for collecting data from various robotic systems (and/or other computing devices, for example, at manual stations), and then training one or more ML models (e.g., including the first ML model) based on the collected data.

Continuing with the example above, the first ML model that is deployed to the first robotic system may have been trained using a supervised ML method, via training samples with associated ground truth labels, to classify various packages received into one or more of a set of classifications. For example, the first ML model may have been trained to classify a package as a particular type of one or more type classes, or a particular weight class of one or more weight classes, etc. The first ML model may utilize the data obtained from the one or more sensors (e.g., raw image data and/or one or more attributes determined from the raw data) to classify the physical object into one or more of the classes using any suitable technique(s), for example, computer vision techniques and/or one or more neural network types (e.g., mask region-based convolutional neural networks (mask R-CNNs)). It should be understood that the first ML model may include one or more sub-models (e.g., one or more classifiers). In this example, the first ML model may be incapable to successfully classify the physical object according to at least one of the classifications (e.g., incapable to determine the package type, incapable to determine if the package is damaged or not, etc.), which may correspond to a classification exception. Accordingly, the first robotic system may transmit data associated with the physical object (e.g., obtained by the one or more sensors) to the central station for further processing, for example, including raw image data, timestamp data, attribute data determined from the raw image data, etc. In this example, the first robotic system may determine that the physical object requires further analysis/processing, and may forward the package via the conveyor system to a manual station. At the manual station, the physical object may be analyzed (e.g., by a handheld scanning device), and further data may be obtained about the physical object (e.g., an object identifier (ID) such as a barcode ID, and/or other package details retrieved from a database based on the object identifier). This data may also be transmitted to the central station. The central station may correlate data about the physical object from various systems (e.g., database information retrieved via the handheld scanning device, the first robotic system, the distribution system, etc.), for example, based on the object identifier. The central station may also (and/or alternatively) correlate data based on a known time window in which the physical object was received by the first robotic system and then later transferred to the manual station. It should be understood that the central station may correlate data, not only for this physical object processed by the first robotic system, described above, but also for other physical objects in which the first robotic system was incapable to perform at least one classification for a respective physical object. Similarly, the central station may also collect (and/or correlate) data received from other robotic systems of the fulfillment center.

The central station may then analyze the collected data utilizing a second ML model, for example, that utilizes an unsupervised learning technique (e.g., k-means clustering). The second ML model may determine a cluster of physical objects with one or more common attributes. For example, the second ML model may include the particular physical object described above (e.g., with respect to the first robotic system) into the cluster based in part on determining that the physical object shares a common attribute with other physical objects (e.g., a common barcode, a common marking on the package, etc.), in which the first ML model had been incapable to classify a respective physical object. It should be understood that, as described herein, inclusion of a physical object within a cluster may not correspond to a "physical action." For example, the cluster may be a logical construct of a group that is represented via one or more data elements and/or data structures. Accordingly, the inclusion of a physical object within a cluster, as described herein, may correspond to including (and/or associating) an identifier (e.g., a data identifier) of the physical object with the data elements and/or data structure that represent the cluster. It should be understood that, by utilizing an unsupervised learning technique (e.g., via the second ML model), techniques described herein may not necessitate ground truth labels to be pre-generated to generate the cluster. Upon the second ML model generating the cluster and determining the common attribute (and/or attributes) of the cluster, the central station may utilize the data determined from the second ML model (which may be referred to herein as "feedback data") to perform one or more operations. In some embodiments, these operations may be associated with a feedback loop that is used to efficiently improve the processing of subsequent physical objects that are determined to have the common attribute(s) of the cluster.

In one example, the feedback data may correspond to data that instructs a first computer system regarding processing subsequent physical objects. For example, the central computer system may instruct the first computer system (e.g., the package distribution system that is upstream from the robotic system within the fulfillment center) to route subsequent packages, which are determined to have the common attribute, to a different path (e.g., to another robotic system, or a manual station) from a particular path to the first robotic system. For example, the common attribute may be added to a "block list," whereby the first computer system blocks (e.g., re-routes) packages that are determined to have one or more attributes on the block list from being routed to the first robotic system. In this way, techniques may improve efficiency of processing objects by the first robotic system, for example, by reducing the possibility for problematic (e.g., unclassifiable) packages from being routed to the first robotic system in the first place. Accordingly, this may increase the overall throughput of the first robotic system.

In another example, the central computer system may also (and/or alternatively) use the feedback data to generate training data (e.g., with suitable ground truth labels) that may be used to retrain the first ML model and generate a third ML model to replace the first ML model on the robotic system. Accordingly, in this case, an output of the unsupervised learning process (e.g., by the second ML model) may be used to generate ground truth labels that are then used to perform supervised learning to retrain the first ML model. The central computer system may then deploy the third ML model to the robotic system, whereby the robotic system may then utilize the third ML model to accurately classify similar physical objects with the common attribute and then process the objects according to the classification. For example, a robotic arm of the robotic system may utilize the one or more classifications to more precisely manipulate the physical objects (e.g., pick up and scan a package), and/or determine if the package is damaged and thus, should be routed to a different location in the fulfillment center. In this way, techniques described herein enable a more efficient feedback loop mechanism for processing of physical objects (e.g., in real-time or near real-time, such as a few seconds, minutes, or hours), for example, by being able to quickly adjust for new types of physical objects in which existing trained models may be incapable to successfully perform classification with high confidence.

Embodiments of the present disclosure provide several technical advantages over conventional systems. For example, techniques described herein enable a system (e.g., including a central station, distribution system, and/or robotic system) to more efficiently adapt to different (e.g., new) types of physical objects and/or otherwise new scenarios in which an existing classifier may not be able to classify physical objects with acceptable confidence. As described herein, this may be enabled in part by a central station that utilizes one or more machine learning techniques. For example, the central station may receive data associated with a physical object from one or more sources (e.g., robotic systems, distribution systems, handheld computing devices, an inventory database, etc.). The central station may receive similar data for a number of physical objects (e.g., from one or more robotic systems), in which those physical objects have been incapable to be classified with high confidence in some aspect. The central station may then utilize an unsupervised learning methodology to determine a class (e.g., a cluster) of physical objects that are known to be problematic, and one or more common attributes of that class. The central station may then use this data for subsequently processing subsequent physical objects that are determined to have these common attributes. Because this unsupervised learning may be performed in near real-time (e.g., without requiring manual curation of ground truth labels), techniques may shorten the feedback loop for adapting the system to effectively process this new class of physical objects. For example, in one solution, the central station may instruct an upstream distribution system (e.g., with a suitable sensor device) to redirect packages that are known to be problematic for processing by a robotic system, thus enabling better throughput by the robotic system. In another solution, the central station may retrain the existing ML model utilized by the robotic system based in part on ground truth labels that are automatically generated via the unsupervised learning process (e.g., which may indicate a new class of object). In either solution, the feedback loop for adjusting to new scenarios may be significant improved. This may not only make the feedback loop process more time-efficient, but also reduce resource consumption (e.g., machine processing resources, memory consumption, etc.). For example, as throughput levels are increased for a given robotic system (e.g., since it may successfully classify and process a higher percentage of items it detects), less machine computing resources may be required to process a given set of physical objects over time.

For clarity of illustration, embodiments described herein may typically refer to a fulfillment center context associated with an inventory system, in which physical objects may correspond to packages. For example, a customer may order an item from a fulfillment center, and then the item may be processed at a warehouse (e.g., by robotic systems, etc.) for packaging and subsequent shipment to the customer. However, embodiments should not be construed to be so limiting. For example, a physical object described herein may correspond to any suitable physical object that may be detected via one or more sensors and/or transported from one location to another. In one non-limiting example, a physical object may alternatively correspond to a luggage type, a part at a manufacturing facility, etc.

FIG. 1 illustrates an example of an inventory system 100, according to embodiments of the present disclosure. In FIG. 1, the inventory system 100 includes a fulfillment center environment 101, a network 132, and a central computer system 130. In this example, the fulfillment center environment 101 may be located within a facility (e.g., a warehouse), whereby component systems of the fulfillment center environment 101 are responsible for processing physical objects (e.g., packages, luggage items, etc.) of the inventory system. As described further herein, operations associated with processing physical objects may include, for example, scanning physical objects via one or more sensor devices, classifying physical objects according to one or more classifications (e.g., via a machine learning (ML) model), determining a path for routing a physical object (e.g., via a conveyor system 124), manipulating a physical object via a robotic device, etc. In some embodiments, various different computing systems of the fulfillment center environment 101 (e.g., a distribution computer system 102, one or more robotic systems 104, 106, and/or 108, etc.) may be communicatively connected to each other via a network (e.g., the network 132), and/or connected to the central computer system 130 via the network 132. As described further herein, the central computer system 130 (which may also be referred to as a "central station") may collect data from one or more of the computing systems of the fulfillment center environment 101, analyze the data, and determine data (e.g., including instructions and/or training data) to be utilized for subsequent processing of physical objects. In some embodiments, the central computer system 130 may be physically located within the fulfillment center environment 101. In some embodiments, the central computer system 130 may be located remotely from the fulfillment center environment 101, for example, within a separate physical location on-premises, or in a cloud computing environment.

Turning to the components of the fulfillment center environment 101 in further detail, the fulfillment center environment 101 may include the distribution computer system 102. The distribution computer system 102 may, among other operations, receive a physical object, analyze the object, and then determine how to distribute (e.g., route) the physical object to a particular path (e.g., via the conveyor system 124). For example, a physical object (e.g., a package) may arrive at the fulfillment center environment 101 (e.g., via a delivery vehicle) and be initially scanned by a sensor device (e.g., including one or more camera devices) of the distribution computer system 102. For example, the distribution computer system 102 may capture one or more images of the package, and then perform an eligibility verification procedure (e.g., a preliminary verification) on the package based in part on the images. This may include, for example, utilizing an ML model (e.g., a neural network classifier and/or other suitable computer vision algorithm) to determine the package type, size, weight, or other characteristic (e.g., attribute), based in part on the images. The distribution computer system 102 may then determine how to route the package based in part on the result of the eligibility verification procedure. For example, suppose that the distribution computer system 102 maintains a checklist (which may also referred to as a "block list," discussed further herein), in which the system 102 verifies if a determined characteristic is suitable for further processing by a robotic system. If yes, the distribution computer system 102 may route the package via the conveyor system 124 to one of the robotic systems. If not, the distribution computer system 102 may route the package via the conveyor system 124 to a different path, for example, to a manual station (e.g., manual station A 116 or manual station B 118) via a conveyor system 126.

It should be understood that the fulfillment center environment 101 illustrated in FIG. 1 is one example configuration. Any suitable arrangement and/or number of computing systems (e.g., including distribution systems, robotic systems, manual stations, etc.) may be used to perform techniques described herein. For example, instead of three robotic systems 104, 106, and 108, there may be any suitable number of robotic systems. Similarly, there may be any suitable number of manual stations, described further herein. In some embodiments, the conveyor systems (e.g., including conveyor system 124 and conveyor system 126) may organized in any suitable configuration and/or be linked together within an overall conveyor system network. For example, conveyor systems 124 and 126 may utilize a same physical conveyor belt, whereby the conveyor system uses one or more routing mechanisms (e.g., locks and/or gates) to ensure that a particular package is routed to the correct destination. In a representative example, the distribution computer system 102 may issue an instruction to the conveyor system 124 to route a package to the robotic system A 104 via particular path 120 of the conveyor system 124 (e.g., including a conveyor belt that connects a main conveyor belt of conveyor system 124 to the robotic system A 104.

Turning to further details about a robotic system of the fulfillment center environment 101, and, using robotic system A 104 as a representative example, the robotic system A 104 may correspond to any suitable computing system that is configured to perform one or more tasks related to processing physical objects. In some embodiments, the robotic system A 104 may include a robotic arm that is configured to receive physical objects along the particular path 120 and manipulate the physical objects utilizing the robotic arm. In some embodiments, the robotic system A 104 may be similar to as described in further detail with respect to a robot station 210 of FIG. 2, described further herein. In some embodiments, one or more sensors of the robotic system A 104 may detect a physical object. For example, consider a case in which the distribution computer system 102 determines to route the physical object via the conveyor system along the particular path 120 of the conveyor system 124 to the robotic system A 104. The one or more sensors of the robotic system A 104 (e.g., including, for example, one or more imaging devices, depth sensors, a networking device, etc.), may detect that the physical object conveyed by the distribution computer system 102 has arrived at a particular location (e.g., a "pick zone," illustrated further in FIG. 3) that is suitable for processing the physical object by the robotic system A 104. The robotic system A 104 may determine (e.g., classify) one or more attributes associated with the physical object based in part on the sensor data obtained. For example, the robotic system A 104 may be determine among other attributes, an object size, depth, shape, reflectivity, a material type, a particular marking, a color, an object identifier (e.g., a barcode of a package), a package type, etc., associated with the physical object. In some embodiments, the robotic system A 104, may utilize one or more algorithms to classify the one or more attributes, including, for example, computer vision algorithms, ML models (e.g., one or more classifiers), and or any suitable combination thereof. For example, the robotic system A 104 may utilize a mask R-CNN model to perform object detection and segmentation. In some embodiments, depending, for example, on the type and/or position of the physical object, some attributes may not be able to be classified by the robotic system A 104. For example, a physical object may be positioned within a pick zone that includes multiple physical objects, such that the physical object is partially obstructed by at least one of the other physical objects. In this case, at least a portion (e.g., none) of the physical object may be not be optically detected by one of the sensors of the robotic system A 104. In some embodiments, only some attributes may be optically detected, which may otherwise be detected if the physical object was not obstructed or otherwise optically distorted in an image. In any case, the robotic system A 104 may maintain (e.g., store) data that is detected about the physical object, for example, raw image data and/or the one or more attributes determined from the image data (e.g., via one or more algorithms). As described further herein, at least some of this data may be subsequently transmitted to the central computer system 130 for further processing.

In some embodiments, the robotic system A 104 may be able to determine that a physical object arrived at (and/or passed through) the pick zone based in part on non-optical data. For example, a networking device of the robotic system A 104 may receive an indication from the distribution computer system 102 that the physical object was routed by the distribution computer system 102 to the robotic system A 104. Accordingly, the robotic system A 104 may determine a time window in which the physical object is expected to arrive at the pick zone. If the physical object does not arrive within that window, then the robotic system A 104 (and/or manual station, described further herein) may infer that the physical object passed through without being detected optically (e.g., being obstructed by another object from optical capture), and may record this data among other attribute data of the physical object.

In some embodiments, the robotic system A 104 may determine instructions for processing the physical object based in part on the one or more attributes and/or classifications determined. For example, as introduced above, the robotic system A 104 may utilize one or more ML classifiers to classify the physical object into a particular height class (e.g., zero to one inch, one inch to twelve inches, etc.), which may correspond to an attribute of the physical object. In another example, the robotic system A 104 may utilize another (or the same) classifier to classify the physical object as a particular type of object (e.g., a box, a padded envelope, a polyethylene bag, etc.), which may correspond to another attribute of the physical object. In another example, the robotic system A 104 may classify the physical object according to a type of segmentation of the object and/or whether the object was successfully segmented within an image (e.g., including determining the line and/or curve boundaries of the object within the image). In yet another example, the robotic system A 104 may attempt to classify whether the package is damaged or not. Accordingly, the robotic system A 104 may attempt to classify the physical object according to at least one of a set of predetermined classifications (e.g., a height classification, an object type classification, etc.). In some embodiments, the robotic system A 104 may determine instructions (e.g., a manipulation profile) for manipulating and/or routing a package based at least in part on whether the physical object was successfully classified. For example, if the physical object was successfully segmented, and a height class is determined, then the robotic system A may determine instructions for utilizing the robotic arm to pick up the package within the pick zone. In another example, if the robotic system A successfully classified a portion of an image as a barcode, then the robotic system A may determine how to pick up the package so that the barcode may be successfully scanned. Any suitable instructions may be determined based in part on classifications (and/or attributes) determined by the robotic system A.

It should be understood that, as described herein, attributes and/or classifications may have various levels of complexity and/or be used to determine other attributes/classifications with increasing levels of complexity. For example, at a base level, raw images and/or other sensor data associated with the physical object may be obtained by the robotic system A. This base level ("raw") data (e.g., image data, measurement data obtained by one or more sensors, etc.) may include and/or be used to determine (e.g., classify) one or more attributes (e.g., a color, a pixel, a depth, etc.) of the physical object. These one or more attributes may be used to determine (e.g., classify) more complex attributes (e.g., a package type, a predefined procedure for manipulating the object with the robotic arm, an indication of whether the package is damaged, etc.).

In some embodiments, the robotic system A 104 may successfully classify one or more attributes (e.g., color, material, size, etc.), but may be incapable to successfully classify the physical object according to at least one of a set of predetermined classifications. For example, the robotic system A 104 may be incapable to detect/classify an object identifier (e.g., a barcode) of the physical object. For example, it may be a new object identifier that an ML model of the robotic system is not been previously trained to recognize. For example, the ML model may have been previously trained to recognize a predetermined set of barcode types/classifications that does not include this new object identifier type. In another example, the robotic system A 104 may be incapable to determine whether the physical object is damaged. For example, the ML model may have been trained to identify certain patterns (e.g., classes) of damages (e.g., scratches, mis-colorings, torn material, etc.). However, this may be a new type of damage that the ML model may not have been trained to classify. In any case, the robotic system A 104 may maintain (and/or store) attribute data associated with the physical object, as described herein. The robotic system A 104 may also store data indicating whether an ML model of the robotic system was incapable to classify the physical object according to any one or more of a set of predetermined classifications.

In some embodiments, the robotic system A 104 may determine instructions to route a physical object based in part on the one or more attributes associated with the physical object. For example, if the robotic system A 104 is able to successfully classify the physical object in accordance with the set of predetermined classifications, the robotic system A 104 may route the physical object to a drive unit A 110 for further processing. In one example, the drive unit A 110 may be an automated vehicle (e.g., a robot vehicle) that is configured to receive and transport the physical object to another location within the fulfillment center environment 110 (e.g., to be sorted and/or shipped out to a customer). In another example, the robotic system A 104 may be incapable to classify the physical object in some way and/or perform an operation in accordance with the classification. In this example, the robotic system A 104 may route the physical object back to the conveyor system 124 (or 126) via an exit path 122, so that the physical object is transported to one of the manual stations, as described further below (e.g., manual station A 116 or manual station B 118).

In some embodiments, the robotic system A 104 may collect and transmit any suitable data associated with the physical object to the central computer system 130 for further processing. For example, the robotic system A 104 may transmit attribute data associated with a detection (or lack of detection) of the physical object by one or more sensors at a particular time. The attribute data may include data (e.g., one or more images) that is captured by the one or more sensors, and/or data that is determined (e.g., derived) from the raw sensor data (e.g., depth information, object type information, etc.). The data may also include information about whether a first machine learning model of the robotic system A 104 was incapable to classify the physical object and/or incapable to perform some operation on the object (e.g., via the robotic arm). In some embodiments, the data may also indicate a time and/or route/path according to which the robotic system A 104 routed the physical object to a downstream destination. As described further herein, another machine learning model (e.g., via an unsupervised learning process) of the central computer system 130 may utilize this data, combined with other data associated with this physical object (and/or other physical objects), to improve subsequent processing of physical objects with a common attribute.

It should be understood that other robotic systems (e.g., robotic system B 106 and/or robotic system C 108) may perform similar operations to as described herein with reference to robotic system A. For example, each robotic system may collect and analyze data associated with physical objects that are conveyed to the respective robotic system. Each robotic system may then determine how to route physical objects, depending in part on the attributes determined for each physical object. For example, robotic system B 106 may route packages that have been successfully processed (e.g., successfully scanning a barcode identifier and determining that the package is not damaged) to the drive unit B 112 (or any other drive unit). Similarly, robotic system C 108 may route packages that have been successfully processed to drive unit C 114 (or any other suitable drive unit). Packages for which an ML model of the robotic system B 106 and/or robotic system C 108 has failed to classify (and/or perform a manipulation operation) may be routed to one of the manual stations. Also, data associated with each physical package may be transmitted from any one or more of the robotic systems to the central computer system 130 for further processing. In this way, the central computer system 130 may collect a substantial amount of data that may be used for improving the efficiency and accuracy of the system, as described further herein.

Turning to the manual stations in further detail, in some embodiments, a manual station may receive a physical object upon a determination that the physical object requires further inspection. In some embodiments, a manual station may include a computing device (e.g., a mobile device with a scanning component) that may be used to scan and process the physical object. For example, consider a case in which robotic system A 104 is incapable of classifying a physical object according to at least one of a set of predetermined classifications. The robotic system A 104 may route the physical object to a manual station A 116 (or manual station B 118) via the exit path 122 and the conveyor system 124. Upon arriving at manual station A 116, the scanner may be used to detect an identifier of the physical object (e.g., via a barcode scan), and obtain further data about the physical object. For example, suppose that the physical object is a package from inventory, which is associated with a type of merchandise, size, weight, etc. This data may be obtained from a database (e.g., associated with the fulfillment center) upon receiving the object identifier via a scan of the physical object. In some embodiments, the computing device at the manual station may receive other input associated with the object (e.g., input via a technician at the fulfillment center). This may include, for example, data indicating that the object is damaged, other markings on the object (e.g., via a pen), or any other suitable data.

In some embodiments, the computing device may also receive and/or determine data that is operable for correlating the physical object received at the manual station with the same object that was previously processed upstream by the distribution computing system 102 and/or by the robotic system A 104 (and/or by any other computing device within the fulfillment center environment 101). For example, suppose that the upstream robotic system A 104 was incapable to detect and classify an object identifier (e.g., a barcode) of a physical object, which may otherwise be used to correlate the processing of the same physical object across multiple devices. However, the robotic system A 104 (and/or the distribution computing system) was able to determine other attributes of the physical object (e.g., a time window during which the object was received/processed by the robotic system A 104, a weight and/or color of the object, etc.). The manual station A 116 may further determine that a physical object was received at the manual station A 116 at a subsequent time that is within the time window. The manual station A 116 may be able to determine that the same physical object is being analyzed, based in part on the correlating attributes of the object (e.g., the known time window, the color of the object, the weight, etc.). It should be understood that any suitable data may be used by a computing device to determine that a physical object processed at one device is the same object that is later processed at another device. In some embodiments, the physical object may be subsequently processed at the manual station following any suitable procedure (e.g., analyzed by an associate and subsequently shipped out). In some embodiments, data that is collected by the manual station (e.g., via scanning the object, or otherwise input via the computing device of the manual station) may also be transmitted to the central computing system 130 for further processing. Note that the central computing system 130 may be responsible for collecting and correlating data from various computing devices (e.g., distribution computing system 102, robotic system A 104, manual station A 116, etc.) in regards to a particular physical object. Also, as depicted in FIG. 1, in some embodiments physical objects that are routed to a manual station via a conveyor system may be processed by any suitable manual station. Accordingly, a physical object may rotate in a round-robin fashion along a conveyor system until the physical object may be processed. In some embodiments, data associated with a physical object that is processed by a manual station may be transmitted and/or further analyzed (e.g., for auditing purposes) by the central computer system 130 based in part on whether the physical object is transferred to a drive unit for further processing. For example, as depicted in FIG. 1, and, using manual station A 116 as a representative manual station, upon manual station A 116 processing a particular physical object, the manual station A 116 may transfer the particular physical object to drive unit D 115. In this example, data associated with the physical object that is collected at manual station A 116 may be transmitted to the central computer system 130 to be used for further analysis (e.g., auditing purposes such as clustering analysis, etc., as described further herein), based in part on the physical object being transferred to the drive unit D 115.

Turning to the central computer system 130 in further detail, the central computer system 130 may be a server computer (e.g., on-premise or within a cloud computing environment) associated with the fulfillment center service provider. In some embodiments, the central computer system 130 may be responsible for coordinating the processing of physical objects within the fulfillment center environment 101. For example, the central computer system 130 may provide data that instructs the distribution computing system 102 regarding how to process (e.g., route) physical objects that are detected by the distribution computing system 102. For example, as introduced above, the central computer system 130 may determine a checklist of rules that may include a block list. In some embodiments, the block list may indicate that, upon detecting a physical object with one or more attributes on the block list, the distribution computing system 102 will transport (e.g., route) the physical object along a different path from a particular fulfillment path. For example, instead of routing the physical object to the robotic system A 104 via the particular path 120, the distribution computing system 102 may route the physical object via the conveyor system 126 to one of the manual stations. As described further herein, this may occur, for example, if the central computer system 130 determines that a particular type of physical object (e.g., with a particular attribute, such as a type of barcode) is incapable of being recognized e.g., classified) by a first machine learning model of one of the robotic systems (e.g., robotic system A 104). In some embodiments, an incapability of first machine learning model to perform the classification may lead to the robotic system being less efficient and/or accurate at processing (e.g., manipulating) physical objects (e.g., reduced throughput), for example, being incapable of performing a particular task (e.g., manipulating the physical object via the robotic arm, determining if the package is damaged, etc.). Accordingly, the central computer system 130 may instruct the distribution computing system 102 to block physical objects determined to have a particular attribute from being routed to the robotic system A 104.

In some embodiments, as described herein, the central computer system 130 may be responsible for collecting data from different devices of the fulfillment center environment 101, determining a cluster of physical objects with a common attribute, and then determining data that is used for subsequently processing other physical objects with the common attribute. For example, the central computer system 130 may receive respective data associated with a plurality of physical objects (e.g., from one or more robotic systems and/or manual stations, as described above). In some embodiments, the central computer system 130 may execute an unsupervised learning process to determine at least one cluster of physical objects with a common attribute. Using an earlier example, suppose that multiple physical objects have been previously determined to be incapable of being classified by a first ML model of a robotic system with respect to an object identifier (e.g., a new barcode type). The central computer system 130 may have received data associated with each of these physical objects (e.g., including attribute data, images of the objects, an indication that the each physical object was incapable of being classified and/or operated upon in a particular way, etc.). The central computer system 130 may then execute a second machine learning model, utilizing an unsupervised learning process (e.g., a k-means clustering algorithm), to determine a cluster (e.g., a class) of physical objects. As described herein, a "cluster of physical objects" may correspond to a logical grouping that is represented via one or more data elements and/or data structures. Accordingly, each physical object of the cluster may be indicated and/or included in the cluster based on an identifier of the physical object being added to the data structure of the cluster. In some embodiments, the cluster of physical objects may be associated with one or more common attributes, whereby a physical object is included within the cluster based in part on having the common attribute. In some embodiments, the common attribute may correspond to (e.g., be an indicator of) a particular type (e.g., class) of physical object. As described above, upon determining this common attribute via the unsupervised ML process, the central computer system 130 may use this information to add the common attribute to a block list. It should be understood that, based in part on the unsupervised ML process not requiring ground truth labeling in advance, this process may be performed more efficiently (e.g., near real-time, such as a few minutes or hours) from other methods that require supervised machine learning algorithms with ground truth labels. In this way, the central computer system 130 may more efficiently enable increased throughput. For example, the central computer system 130 may ensure that robotic systems are conveyed physical objects that they are most likely to be capable of successfully classifying and/or manipulating, while ensuring that other physical objects are (e.g., temporarily) directly routed to a manual station for separate processing (e.g., via conveyor system 126).

In some embodiments, the central computer system 130 may also utilize the data (e.g., cluster data) that is output from the second machine learning model (e.g., via the unsupervised learning process), described above, to retrain a first machine learning model of one or more of the robotic systems. For example, the central computer system 130 may have previously trained the first ML model using first training data. A training data sample of the first training data may be associated with a "ground truth" label, which may correspond to information that is determined to be verified with acceptable confidence. In this case, the first training data may be updated to generate second training data that includes new training data samples. A new training data sample may correspond to data associated with a physical object of the cluster. Note that a training data sample may include any suitable data and/or attributes associated with a physical object, including, for example, raw data and/or data (attributes) derived from raw data. As described herein, non-limiting examples of raw data may include image data, measurement data (e.g., weight), and/or other data obtained from one or more sensors. Other data that may be included in a training sample may include data that is derived from raw sensor data, including, for example, any attributes (e.g., shape, segmentation within an image, etc.) that are derived from the sensor data. In some embodiments, a raw data element (e.g., a portion image data, a measurement data sample, etc.) may itself correspond to a type of attribute of a physical object. The new training data sample may be labeled with a ground truth label that corresponds to the common attribute (e.g., class) of the cluster. For example, suppose that the common attribute of the cluster is associated with a new type of object identifier or marking. In this example, the training data sample is then automatically associated with the ground truth label, without requiring manual intervention. The central computer system 130 may then use a supervised machine learning process to retrain the first machine learning model (e.g., using the second training data with the new training data samples) to produce a third machine learning model. The central computer system 130 may then deploy (e.g., transmit) the third machine learning model to one or more robotic systems for operation in the fulfillment center environment 101. In this way the central computer system 130 may facilitate not only more efficiently routing physical objects upstream from a robotic system (e.g., via a block list), but also retraining the robotic systems to adapt to new types of physical objects. One or more of both goals may be performed in real-time or near-real time (e.g., minutes or hours).

Although FIG. 1 illustrates the central computer system 130 as a component separate from the robotic systems, the central computer system 130 or functionalities thereof, may be integrated with a set of robotic system or distributed among the robotic systems. Further and although FIG. 1 illustrates that the central computer system 130 supports a single inventory system, the central computer system 130 may support a larger number of inventory systems. Conversely, a single inventory system may subscribe to and be supported from multiple central computer systems.

Figure 2:
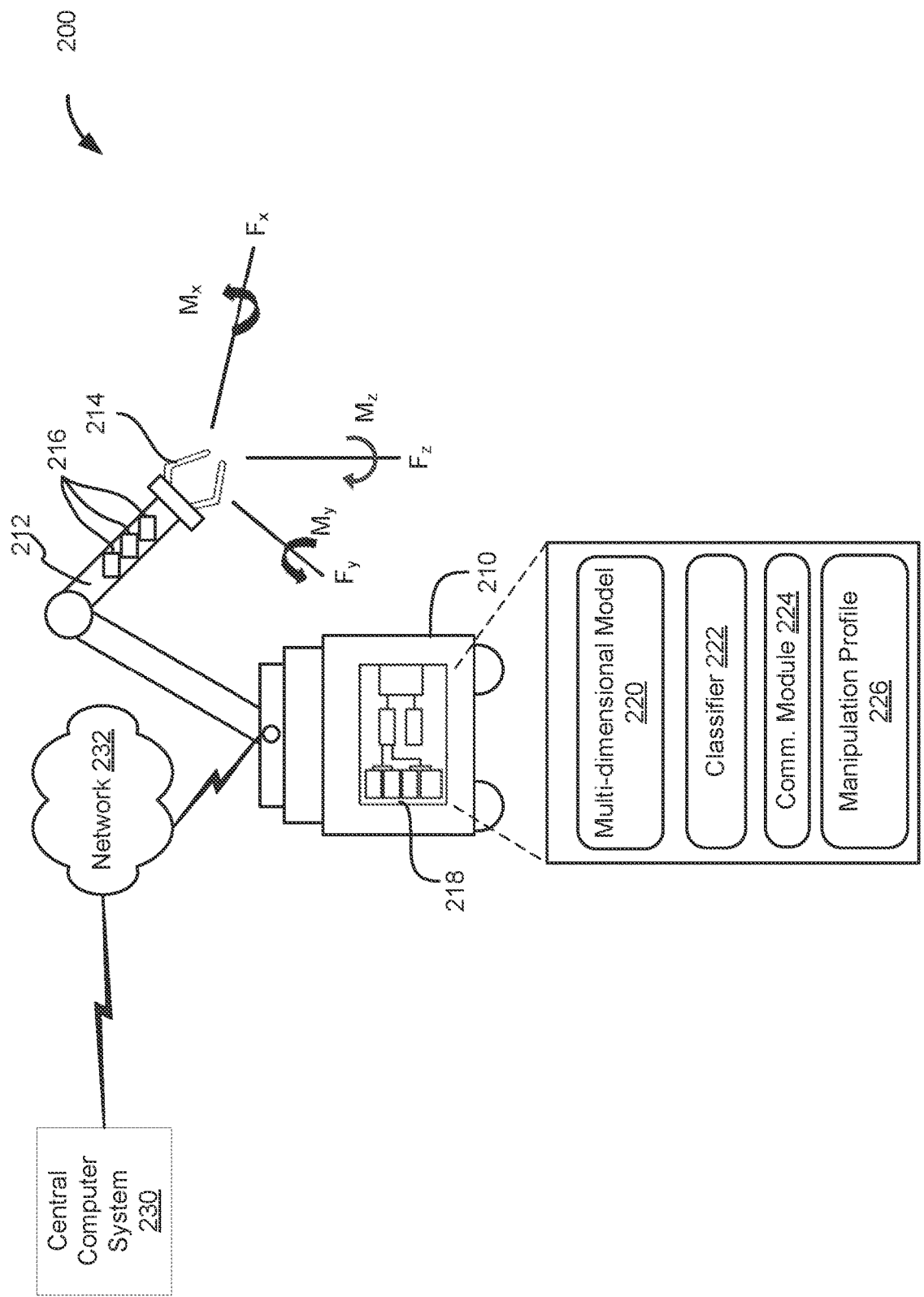
FIG. 2 illustrates example components of a robot system, according to embodiments of the present disclosure.

FIG. 2 illustrates example components of a robotic system (which may be otherwise referred herein to as a "robot station"), according to embodiments of the present disclosure. The robot station 210 of diagram 200 of FIG. 2 may be an example of a robotic manipulator. Generally, a robotic manipulator may represent a robotic system that may manipulate an item (e.g., a physical object). FIG. 2 further illustrates components of the robot station 210 as an example of a robotic manipulator. Similarly to the robot stations of FIG. 1 (e.g., robotic system A 104, etc.), the robot station 210 may be in communication with other devices of a fulfillment center environment, such as a central computer system (e.g., central computer system 230, which may be similar to central computer system 130) over a network (e.g., network 232).

The robot station 210 may include a robotic arm 212 and an end effector 214. Although the description herein primarily refers to a robotic arm 212, any other mechatronic or robotic device (e.g., including any suitable device to be used for manipulating a physical object) may be used in lieu of or in addition to a robotic arm. The end effector 214 may be connected to an end of the robotic arm 212 and configured to manipulate a physical object. Any suitable end effector (or number or combination of end effectors) may be utilized, including, but not limited to, soft robotic effectors, vacuum effectors, electro-adhesion effectors, and mechanical or electromechanical effectors. Soft robotic end effectors may generally include flexible structures that may be manipulated between various orientations. The structures may include silicon bodies or other flexible material. Manipulation of the flexible material may be achieved through use of flexible actuators such as air muscles (e.g., contractile or extensional devices operated by pressurized air movement relative to filling or emptying a pneumatic bladder), electroactive polymers (e.g., polymers which change size or shape when stimulated by an electric field), or ferrofluids (e.g., fluids having suspended ferro-magnetic particles capable of altering a size or shape of the fluid volume when subjected to a magnetic field). Vacuum end effectors may manipulate physical objects using suction. Electro-adhesion end effectors can include an array of electrodes arranged along a flexible or rigid substrate capable of applying a charge (akin to static electricity) that can adhere a physical object to the substrate portions that are in contact with the physical object. Mechanical or electromechanical end effectors may include pinchers, claws, grippers, or other rigid components that may be actuated relative to one another for manipulating a physical object. Other end effectors may also be utilized to facilitate additional manipulation techniques, such as trays, scoops or other similar structures. For example, a magnetic or electromagnetic end effector may be useful for manipulating physical objects having ferro-magnetic materials.

In an example, the robot station 210 may also include a set of sensors 216, which may be similar to the sensors of the robotic systems described in reference to FIG. 1. The sensors 216 may be installed at different points of the robot station 210 including, for instance, at the robotic arm 212 and/or the end effector 214. The sensors 216 may be configured to sense parameters associated with a physical object manipulation. These parameters may be processed by a computer system 218 of the robot station 210 to generate manipulation data and control operations of the robotic arm 212 and/or end effector 214. In some embodiments, a sensor of the robot station 210 may correspond to and/or include a networking device that is communicatively connected to the robot station 210. In some embodiments, a sensor that includes the networking device may be positioned upstream or downstream from the robot station 210, for example, physically separated from the set of sensors 216. In some embodiments, the networking device and/or associated sensor device may obtain data associated with a physical object (e.g., image data), and then transmit that data via the networking device to the robot station 210 for further processing (e.g., to prepare to receive and further analyze the physical object within a pick zone). In one example, data associated with a physical object that is received from the networking device may also correspond to (e.g., include) one or more attributes of the physical object.

Generally, the sensors 216 may include different types of sensors to determine attributes of a physical object to be manipulated. For example, imaging devices or optical sensors may be used to determine physical characteristics, such as size, shape, position, orientation, and/or surface characteristics (e.g., how porous and/or slippery the physical object is based on the surface appearance). Any suitable optical technology can be utilized, including, but not limited to, two-dimensional cameras, depth sensors, time of flight sensing (e.g., broadcasting a source of light and determining a time of reflection for each pixel to determine a distance from the sensor for each pixel to determine a three-dimensional array of data points representing a virtual model of the sensed physical object and environment), structured light sensing (e.g., projecting a known image from a light source, observing the image as distorted by variations in the surface of the detected physical object, and analyzing the distortions with respect to the projected image to determine positioning of the features that caused the distortion), stereo sensing (e.g., analyzing differences in images collected from multiple cameras arranged at known offsets from one another to generate a point cloud or digital model), active stereo sensing (e.g., projecting a pattern of light to improve precision of detection of features while using stereo sensing), any other optically-based methodology of observing light for generating a digital representation of a physical object, or any combination thereof.

Additionally or alternatively, other sensors may be used for other sensing data (e.g., force sensing, tactile sensing, pressure sensing, voltage sensing, conductance sensing, ultrasonic sensing, x-ray sensing, or other sensing), such as to determine physical attributes of a detected physical object to be grasped or its surroundings, such as structural integrity, deformability, weight, surface characteristics (e.g., how slippery the physical object may be), or other physical attributes of a detected physical object.

In an example, the sensors 216 may include imaging or optical sensors capable of taking images of a physical object. The optical sensors may form a two or higher dimensional imaging device (e.g., a camera) and may provide color, grayscale, or black and white images at different resolutions. As described further herein, the computer system 218 may implement various image processing and/or machine learning techniques to generate a multi-dimensional model 220 of the physical object (e.g., a two, two and half, and/or three dimensional model). The computer system 218 may use the multi-dimensional model 220 to position and/or orient a physical object, identify surfaces and features of the physical object, and accordingly activate the robotic arm 212 and end effector 214 to manipulate the physical object.

The sensors 216 may also include grasp and position sensors. The computer system 218 may use these sensors to also generate or update the multi-dimensional model 220. For example, the computer system 218 may use the sensors to move the end effector 214 along the edges and surfaces of a physical object and to accordingly map these edges and surfaces. The computer system 218 may also use the sensors to control different grasps and positions of the grasps applied to the physical object and the resulting successes or failures in manipulating the physical object. Accordingly, the computer system 218 may also add data about the grasps and positions to the multi-dimensional model 220.

Other types of sensors may also be used. For example, suitable sensors may be installed at the robot station 210 and used by the computer system 218 to measure a weight, volume, center of gravity, and/or other structural characteristics (how rigid, flexible, bendable, etc.) of a physical object. These sensors may include, for instance, pressure, position, force, weight, touch, and/or other sensors. Such information may be added to the multi-dimensional model 220.

In an example, the sensors 216 may be configured for two dimensional imaging. Typically, two dimensional imaging may be cheaper (component cost and computational resource cost) to use relatively to higher dimensional images. In such situations, a two and half or higher dimensional model 220 may nonetheless be used. To do so, the computer system 218 may map two dimensional images to the multi-dimensional model 220.

The map may rely on features (e.g., attributes) of the physical object. In other words, the multi-dimensional model 220 may identify features on surfaces of the physical object, and/or the relative distances, positions, and orientations of the features. Thus, a two dimensional image of the physical object showing a feature may allow an identification of a respective surface. If the two dimensional image (or a plurality thereof) shows multiple features, relative distances, positions, and orientations of these features may be determined. As such, rather than using higher dimensional and more expensive imaging devices, the robot station 210 may include a two dimensional imaging device. Generated two dimensional images of a physical object may be mapped to the multi-dimensional model 220 allowing the computer system 218 to determine the relative positon and orientation of the physical object in three dimensional space.

In some embodiments, as described herein, one or more classifiers 222 of the computer system 218 may enable the robot station 210 to map images (e.g., two-dimensional images) to the multi-dimensional model 220. In some embodiments, a classifier 222 may correspond to a machine learning model (e.g., which may utilize/incorporate image processing techniques, such as mask R-CNN for object instance segmentation, pattern recognition, and/or edge detection) that is used to generate and/or map to the multi-dimensional model 220. In some embodiments, a classifier 222 may be trained using a supervised learning process that utilizes training data samples, whereby a training data sample is associated with a ground truth label. In some embodiments, the ground truth label may correspond to a feature (e.g., an attribute) of the physical object associated with the training data sample (e.g., a particular barcode type, a particular type of package, a type of marking on the package, etc.). In some embodiments, as described herein, attributes of the physical object may correspond to any suitable level of complexity and/or abstraction. In this way, the classifier(s) 222 may be used to map images to the multi-dimensional model 220 that is utilizable for manipulating the physical object (e.g., via the robotic arm 212).

In some embodiments, a classifier 222 may output a score that corresponds to a level of confidence in a particular classification of an attribute of the physical object. In some embodiments, the score may be compared against a particular threshold value to determine if the score matches (e.g., equals or exceeds) the threshold value. As described herein, a first value "matching" a second (e.g., threshold) value may correspond to the first value equaling or exceeding the second value. If the score does not match the threshold value, then the computer system 218 may determine that the robotic system is incapable to classify at least one attribute of the physical object according to at least one classification (e.g., of a set of predetermined classifications) with an acceptable level of confidence. In some embodiments, this incapability may be associated with the robotic system being incapable to generate and/or map images to the multi-dimensional model 220 and/or perform an operation (e.g., via the robotic arm 212) utilizing the multi-dimensional model 220.

In some embodiments, a communications module 224 of the computer system 218 may be in communication with other devices associated with a fulfillment center environment (e.g., fulfillment center environment 101 of FIG. 1). For example, the central computer system 130 of FIG. 1 may train (and/or re-train, as the case may be) one or more classifiers 222 of a first machine learning model and then transmit the first machine learning model to the robot station 210 for subsequent use.

In addition, the communications module 224 of computer system 218 may receive and store a local manipulation profile 226 from the central computer system 130. The local manipulation profile 226 may represent a manipulation profile customized to the robot station 210. The customization may be based on manipulation capabilities (e.g., what robotic arms and end effectors are installed at the robot station 210), usages of the robot station 210 (e.g., what tasks the robot station 210 may perform), and/or the physical objects that the robot station 210 may manipulate. In an example, the local manipulation profile 226 may include the multi-dimensional model 220 and/or a list of one or more attributes which the robot station 210 may attempt to detect (e.g., classify). In another example, the local manipulation profile 226 may specify how the multi-dimensional model 220 and the list of attributes may be used to manipulate a physical object. The computer system 218 may access and use the local manipulation profile 226 to control the robotic arm 212, the end effector 214, and/or the sensors 216 in order to manipulate the physical object according to the local manipulation profile 226.

In some embodiments, the communications module 224 may collect and transmit data associated with a particular physical object to the central computer system 130 for further processing. For example, as described herein, suppose that one of the classifiers 222 is incapable to classify a particular physical object according to at least one classification (e.g., associated with a particular attribute). This information may be transmitted to the central computer system 130 as first data. The communications module 224 may also collect, as second data, one or more attributes that were successfully determined (e.g., classified) by the first machine learning model and associated with the particular physical object, and transmit the second data to the central computer system 130. In some embodiments, the second data may also and/or alternatively include raw data captured via the one or more sensors 216 (e.g., images, etc.). As described herein, the central computer system 130 may utilize the first data and/or second data to subsequently perform unsupervised learning (e.g., utilizing respective data associated with a number of physical objects).

In some embodiments, data exchanged between the computer system 218 and the central computer system 230 may include manipulation data from the robot station 210 over the network 232 and/or from other robot stations over the same or different network. The manipulation data may include, for example, data from or the actual multi-dimensional model 220 and/or the list of attributes. In some embodiments, the manipulation data may indicate if some failure (e.g., incapability) occurred when attempting to manipulate the physical object, for example, the failure being associated with a particular attribute of the list of attributes.

Although FIG. 2 illustrates a single robot station 210 connected to a central computer system 230 over a network 232, there may be a much larger number of robot stations within an inventory system (e.g., similar to as described in reference to FIG. 1). As such, the data exchange and the data processing may be large. In certain situations, a tradeoff may be considered to balance between the data exchange and the data processing.

In some embodiments, one or more of the operations described in reference to computer system 218 may alternatively be performed by the central computer system 230 (or another computing system). For example, the central computer system 230 may receive sensor data of a physical object from the robot station 210, whereby the central computer system 230 performs operations to classify the physical object, and then send instructions for manipulating the object back to the robot station 210.

In some embodiments, network bandwidth and processing efficiencies may be achieved by generating the multi-dimensional model 220, the list of attributes, and/or the local manipulation profile 226 for a physical object type rather than for a specific physical object. An physical object type may represent a type of physical objects, where the physical objects may share a common attribute. In some embodiments, the attribute may be associated with how the physical objects with that type may be manipulated. For example, the common attribute may indicate that a common manipulation may be applied to the physical objects given the common attribute. The attribute may be a physical attribute, such as size, shape, weight, volume, structure, fragility, etc. As such, the physical object type may represent a type of physical objects that may be fully or partially manipulated in a same or similar manner (e.g., based on the number of common manipulations). For example, books of different sizes may belong to one broad physical object type. However, soft cover books and hard cover books may belong to two different physical object types. In some embodiments, as described herein, the central computer system 230 may utilize data received from the robot station to determine one or more physical object types (e.g., utilizing unsupervised ML techniques).

Figure 3:
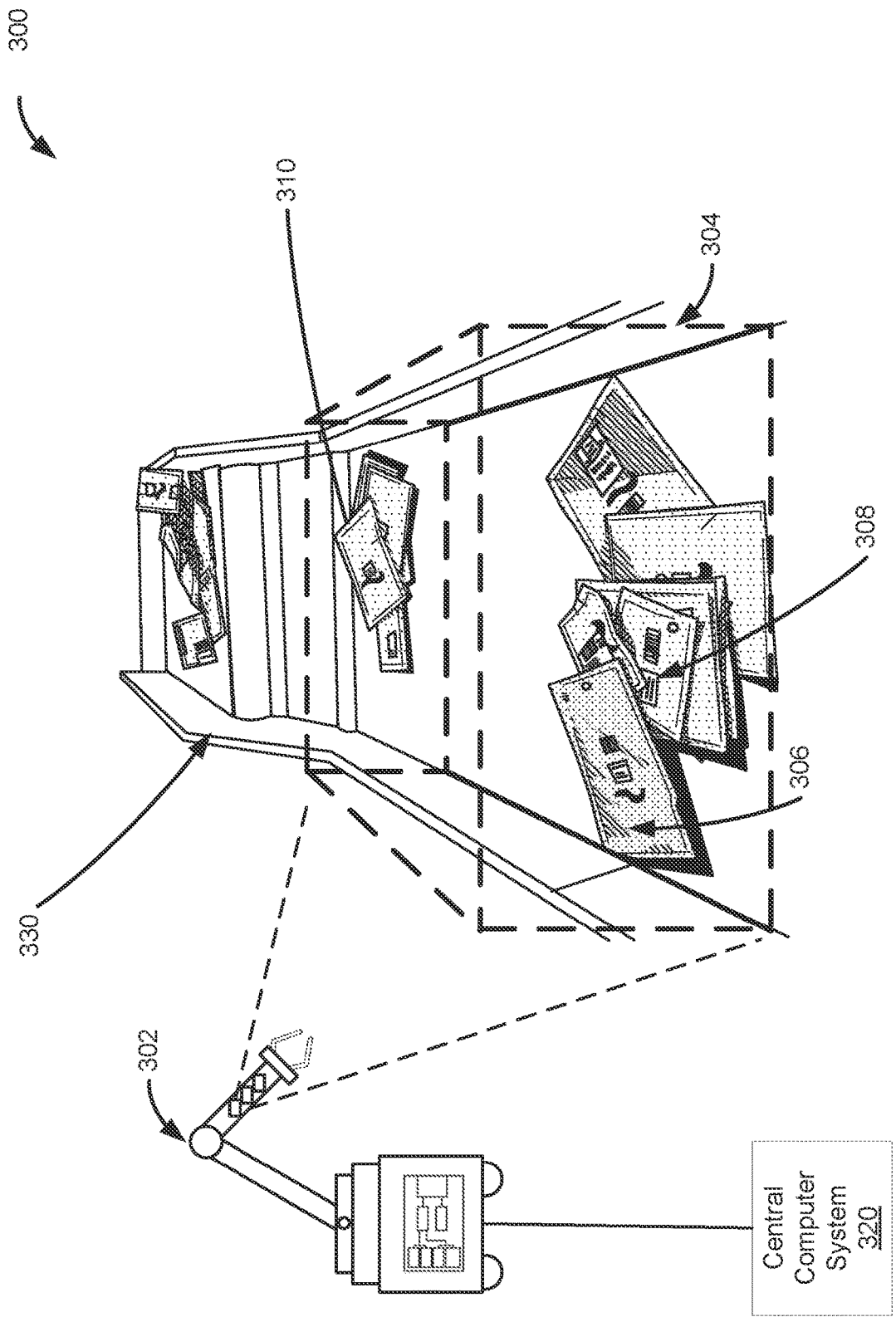
FIG. 3 illustrates an example technique for performing classification of a physical object, according to embodiments of the present disclosure.

FIG. 3 illustrates an example technique for processing a physical object, according to embodiments of the present disclosure. In diagram 300 of FIG. 3, a robot station 302, a central computer system 320, and a conveyor system 330 are illustrated. These components may be similar, respectively, to other similarly named systems described herein. As illustrated in diagram 300, one or more physical objects (e.g., packages) may be conveyed (e.g., by a distribution computing system 102) to the robot station 302 via the conveyor system 330. Note that the conveyor system 330, as depicted in FIG. 3, may represent a portion of a conveyor system network that is used to route packages throughout a fulfillment center environment, as further illustrated with respect to FIG. 1. As described herein, the robot station 302 may execute a machine learning model to classify the one or more physical objects, respectively, as a particular physical object type. Based in part on classifying a particular physical object as the particular physical object type, the robot station 302 may determine how to process the particular physical object (e.g., according to a local manipulation profile 226 for the particular physical object type). As further illustrated below, the robot station 302 may be incapable to classify the particular physical object with regard to some attribute, and/or may be incapable of subsequently performing a manipulation on the object (e.g., scanning a barcode of the package via a robotic arm). In this scenario, data associated with the physical object may be transmitted to and processed by the central computer system 320, so that subsequent physical objects with a similar type (e.g., classification) are processed more efficiently.

Turning to diagram 300 in further detail, one or more physical objects (e.g., packages) may be detected by one or more sensors of the robot station 302 within a pick zone 304 that is detectable by the one or more sensors (e.g., illustrated in diagram 300 via a rectangular dotted-line box-shaped wireframe for clarity of illustration). In some embodiments, the physical objects may arrive within the pick zone 304 in any suitable positioning (e.g., random positioning by being tossed onto the conveyor belt). For example, as depicted in FIG. 3, the packages are partially overlaid on top of each other in a random positioning. In some embodiments, the sensors of the robot station 302 may capture data (e.g., images, weight information, etc.) regarding the pick zone 304, and then a machine learning model of the robot station 302 may process the data to classify the one or more packages. In some embodiments, physical objects outside the pick zone 304 (e.g., including packages 310) may not be detected and/or classified, at least until they reach the pick zone 304.

Within the pick zone 304, and, as a representative example physical object, the machine learning model of the robot station 302 may perform segmentation to determine the shape of physical object 306. Accordingly, the machine learning model may classify the physical object 306 as a square and/or rectangular shape, among a predetermined set of shape classifications (e.g., circular, cylindrical, etc.). The machine learning model may further classify a type of physical object, for example, to be a padded mailing envelope type of package (e.g., among a set of possible package types). In yet another example, the machine learning model may recognize and classify an object identifier (e.g., a barcode label) of the physical object 306 as a particular type of object identifier label. As described herein, it should be understood that any suitable classification may be performed so that the robot station 302 may determine how to operate on (e.g., manipulated) the package. For example, the one or more classifications may determine how to manipulate the package via the robotic arm, and/or scan the barcode label on the package. In this example, the physical object 306 is successfully classified so that the robot station 302 determines a particular local manipulation profile 226 to use for manipulating the package. After manipulating and processing the package, the robotic arm may transfer the package to a drive unit. For example, in a case where the robot station 302 corresponds to the robotic system A 104 of FIG. 1, the robot station 302 may place the physical object 306 on the drive unit A 110, to be subsequently transported to another location for further processing (e.g., being shipped out to a customer).

Consider another representative example case, in which the machine learning model of the robot station 302 is incapable to classify a second physical object 308 according to at least one of a set of predetermined classifications. For example, suppose that the machine learning model is incapable to classify a new barcode label type of the second physical object 308. In this case, the robot station 302 may be incapable to perform an operation to scan the new barcode label type, based at least in part on being incapable to classify the barcode label. In another embodiment, the machine learning model may mis-classify the barcode label as another type of label, which may subsequently cause another operation to be unsuccessfully performed (e.g., scanning the label via a sensor). It should be understood that one or more classifications (e.g., a weight classification, a color classification, shape, reflectivity, material type, marking type, package damage indicator, etc.) may fail and/or be misclassified by the machine learning model. In some embodiments, this data may be transmitted to the central computer system 320 for further processing, for example, to perform unsupervised machine learning (e.g., k-means clustering) utilizing this data.

In some embodiments, although one or classifications may be unsuccessfully performed (e.g., according to an acceptable confidence level) and/or one or more manipulation operations may fail to be performed (e.g., according to a local manipulation profile), the robot station 302 may obtain data associated with one or more other attributes of the second physical object 308 (and/or the other physical objects of the pick zone 304). As described herein, these attributes may include, for example, raw sensor data (e.g., images of the physical object), and/or other attributes that are determined from the raw sensor data (e.g., depth information, color information, markings, segmentation of the object, etc.). In some embodiments, and, similar to as described above with respect to classifications that the robot station 302 was incapable to perform, these attributes may be transmitted to the central computer system 320 for further processing.

In some embodiments, the robot station 302 may be incapable of detecting a physical object within the pick zone 304 via one of the optical sensors. For example, suppose that the physical object has similar characteristics as another physical object, such that the machine learning model of the robot station 302 is incapable to segment (e.g., including determining an outline of) the physical object as distinct from the other physical object(s). In this example, the physical object may subsequently be received downstream from the robot station 302 at a manual station (e.g., manual station A 116 of FIG. 1). As described herein, a computing device at manual station A 116 may scan the physical object and determine that the physical object was conveyed by the distribution computing system 102 to the robot station 302 (e.g., which may correspond to robotic system A 104 of FIG. 1) at a first time, and then later received by the manual station A 116 at a second time. This time delta may correspond to a time window, in which the computing device may determine that the physical object failed to be segmented (and/or otherwise classified) by the robot station 302. This data may be transmitted to the central computer system 320 for further processing. In this way, attribute information associated with a location of the physical object (and/or an incapability to classify the object at the location) may be accounted for, even in a case where the physical object may not be detected (e.g., optically or otherwise) by a particular device at the location (e.g., a robot station).

Accordingly, it should be understood that the central computer system 320 may receive data associated with a particular physical object from multiple sources and/or origination points (e.g., upstream and/or downstream systems) along a fulfillment path. This data may be correlated to determine which physical object the data is associated with, based at least in part on one or more factors. For example, the data may be correlated against a scanned unique identifier of the physical object (e.g., a barcode), which may be scanned at one or more locations along the fulfillment path. In another example, the data may be correlated against a known time window during which the physical object was conveyed to one or more points (e.g., the robot station 302, a downstream manual station, etc.) along the fulfillment path. In another example, the data may be correlated against a known weight of the object, a known marking, or any other suitable attribute of the object.

In some embodiments, the central computer system 320 may collect respective data for a plurality of physical objects that are processed by (and/or conveyed to) the robot station 302, in which the robot station 302 may be incapable to classify or otherwise operate on the physical object in some way. Similarly, the central computer system 320 may collect respective data for physical objects that conveyed to any one or more (e.g., all) of the robot stations of a fulfillment center. In this way, the central computer system 320 may collect a more comprehensive set of data that may be used to perform unsupervised learning to identify a cluster of physical objects according to a common attribute (e.g., a new classification). This may be used to process subsequent physical objects with the common attribute, as described herein.

Figure 4:
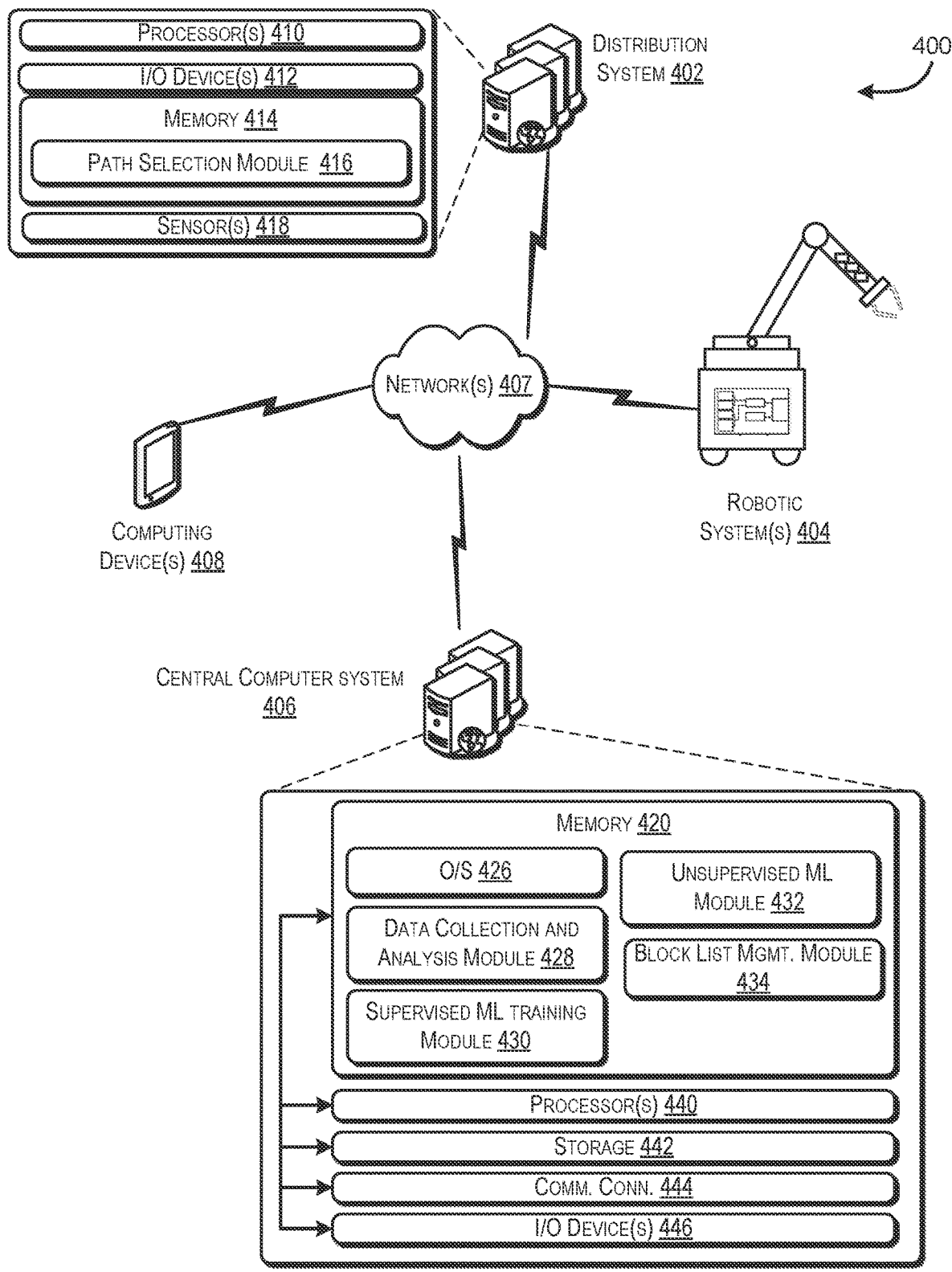
FIG. 4 illustrates an example architecture of a central computer system that utilizes machine learning techniques to enable classification of a physical object, according to embodiments of the present disclosure.

FIG. 4 illustrates an example architecture of a central computer system that utilizes machine learning techniques to enable classification of a physical object, according to embodiments of the present disclosure. The diagram 400 includes one or more systems that may respectively interact with a central computer system 406, including a distribution system 402, one or more robotic systems 404, and one or more computing devices 408. In some embodiments, each of these devices may be arranged similarly to (or different from) as described with respect to FIG. 1, for example, the distribution system 402 may be similar to distribution computing system 102 of FIG. 1. In some embodiments, one or more of the operations of the central computer system 406 may be performed by another system (e.g., the robotic system 404).

Turning to the distribution system 402 in further detail, the distribution system 402 may be any suitable computing device that is capable communicating with the central computer system 406 (e.g., via a network 407) to request and/or receive instructions for processing physical objects. In some non-limiting examples, the distribution system 402 may be a server computer. In some embodiments, the distribution system 402 may contain at least one or more processing units (or processor(s)) 410, an input/output (I/O) device(s) 412, a communications connection interface, and a memory 414.

The memory 414 may store program instructions that are loadable and executable on the processor(s) 410, as well as data generated during the execution of these programs. The memory 414 may be volatile (such as random access memory (RAM)) and/or non-volatile (such as read-only memory (ROM), flash memory, etc.). In some implementations, the memory 414 may include multiple different types of memory, such as static random access memory (SRAM), dynamic random access memory (DRAM) or ROM. The distribution system 402 may also include additional storage, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the distribution system 402 may also include I/O device(s) 412, such as for enabling connection with a keyboard, a mouse, a pen, a voice input device, a touch input device, a display, speakers, a printer, etc. The distribution system 402 may also contain the communications connection interface that allows the distribution system 402 to communicate with the central computer system 406.

In some embodiments, the distribution system 402 may also include one or more sensors 418, which may be similar to one or more of the sensors described herein, with respect to a robotic system.

Turning to the contents of the memory 414 in more detail, the memory 414 may include an operating system and one or more application programs or services for implementing the features disclosed herein, including a path selection module 416. In some embodiments, the path selection module 416 may comprise code that causes the processor 410 to execute one or more operations conveying (e.g., routing) a particular physical object on a particular path. For example, the distribution system 402 may utilize a sensor to determine a weight, shape, or other attribute of the physical object that is received by the distribution system 402. Then, based in part on this attribute data, the distribution system 402 may determine how to route the physical object. For example, as described herein, these one or more determined attributes for a particular physical object may be referenced against a list (e.g., a block list) that includes a list of attributes (e.g., corresponding to characteristics and/or object classes). In some embodiments, if a physical object is determined to have at least one of the attributes on the block list, then the physical object may be routed to a different path from a particular path to a robotic system. For example, the attribute(s) on the block list may respectively be associated with a particular class of physical object, which is determined to be incapable of being correctly classified by an existing machine learning model of a downstream robotic system. In this case, the physical object may be routed to a manual station (e.g., manual station A 116 of FIG. 1), whereby the computing device 408 of the manual station may be utilized to further process the physical object, as described herein. In another case, in which the determined attributes of the physical object are not found when referenced against the block list, the distribution system 402 may route the physical object to one of the robotic stations. For example, a particular robotic system (e.g., robotic system C 108) may be tasked with processing objects in a certain weight class. In this case, weight of the physical object may match the weight class, and thus, the physical object may be routed to the robotic system C 108. It should be understood that any suitable algorithm may be used to determine how and where to route physical objects based in part on attributes of a physical object.

In some embodiments, the network 407 may include any suitable communication path or channel such as, for instance, a wire or cable, fiber optics, a telephone line, a cellular link, a radio frequency (RF) link, a WAN or LAN network, the Internet, or any other suitable medium. The network 407 may include any one or a combination of many different types of networks, such as cable networks, the Internet, wireless networks, cellular networks, and other private and/or public networks.

Turning to the computing device 408, the computing device 408 may be associated with (e.g., correspond to) a manual station. The computing device may be any suitable device that is capable of receiving input data associated with a physical object, and/or transmitting that input data to another device (e.g., the central computer system 406) for further processing. In some non-limiting examples, a user device may be a tablet device, a PC, a mobile phone, etc. In some embodiments, the computing device 408 may be equipped with a sensor component, for example, that is operable for obtaining (e.g., scanning) an object identifier of a physical object (e.g., a barcode, a Quick Response (QR) code, etc.). In some embodiments, based on the object identifier, the computing device 408 may retrieve data associated with the physical object from a database of the fulfillment center. For example, in the case of an inventory system, the database may contain product information and/or other logistical information such as, a weight of the product, a type of the product, or other product specifications. In some embodiments, the computing device may obtain additional data about the physical object. For example, the computing device may receive input (e.g., by an agent of the fulfillment center) indicating a degree of damage of the physical object, whether the physical object is repairable, etc. As described herein, these one or more data inputs may be correlated with data associated with the physical object that was processed by an upstream system (e.g., the robotic system 404), for example, based on a known time window and/or unique object identifier. In some embodiments, this data may be transmitted for further processing by the central computer system 406, as described herein.

Turning to the robotic system 404, the robotic system 404 may be similar to any of the robotic systems (e.g., robot stations) described herein, for example, in reference to robot station 210 of FIG. 2 and or robotic system A 104 of FIG. 1.

Turning to the central computer system 406 in further detail, the central computer system 406 may include a memory 420, a processor 440, a storage 442, a communications connection interface 444, and an I/O device(s) 446. In some embodiments, each of these elements may be similar (or different) from respective elements described in reference the distribution system 402. In some embodiments, the elements of the central computer system 406 may be included within one or more server computers (e.g., server clusters) that form a distributed computing system. In some embodiments, the memory 420 may also include (and/or be associated with) a data store (e.g., a database of the inventory system that includes information about physical objects received by the fulfillment center).

Turning to the contents of the memory 420 in more detail, the memory 420 may include an operating system 426 and one or more application programs or services for implementing the features disclosed herein, including a data collection and analysis module 428, a supervised machine learning training module 430, an unsupervised machine learning module 432, and a block list management module 434. In some embodiments, one or more of these modules may implement an Application Programming Interface (API), for example, to facilitate communication between modules and/or with the other device (e.g., the robotic system 404 and/or the distribution system 402).

The data collection and analysis module 428 may comprise code that causes the processor 440 to perform one or more operations related to collecting and analyzing data associated with one or more physical objects. As described herein, the central computer system 406 may receive data, associated with a particular physical object, from one or more computing sources (e.g., robotic system(s) 404, computing device(s) 408 of a downstream manual station, and/or the upstream distribution system 402). The data collection and analysis module 428 may correlate the data received from different sources associated with the particular physical object. In some embodiments this correlation may be performed based in part on one or attributes and/or data points, including for example, a unique object identifier of the particular physical object and/or an identifier for a container of the particular physical object. For example, this unique object identifier may have been obtained by the robotic system 404 and/or the computing device 408 upon scanning a label with the object identifier attached to the particular physical object. In a case where a container for the physical object is involved, the container (which itself may be a type of physical object) may contain a plurality of physical objects including the particular physical object. The container itself may have an object identifier, which may be associated with a manifest file (e.g., stored in a data store). The data collection and analysis module 428 may determine the particular physical objects (and/or physical object types) within the container based in part on the manifest file that may be obtained by scanning the object identifier of the container. In some embodiments, this correlation of data from different sources may be performed based in part on a known time window during which the physical object was conveyed from the distribution system 402, through the robotic system 404, and/or arriving at a downstream manual station for further processing. As described herein, the data collection and analysis module 428 may receive data associated with one or more attributes of the particular physical object from any one of the sources, which may be correlated together and associated with the particular physical object, as described above.

In some embodiments, an attribute of the physical object may correspond to any suitable information associated with the physical object (e.g., including a digital representation of the physical object) and/or the conveyance of the physical object through the fulfillment center. In some embodiments an attribute may correspond to data obtained by one or more sensors (e.g., of the robotic system 404), such as image data, which includes at least a portion of the physical object. In some embodiments, an attribute may be derived from sensorial data, for example via a machine learning model that receives an image data as input, and may output a particular classification. This may correspond to, for example, a type of the physical object, a segmentation of the physical object, etc. In some embodiments, an attribute may correspond to data associated with the physical object that is obtained from a data store (e.g., an inventory data store), such as, a dimension of the physical object, or other technical specification. In some embodiments, the data collection and analysis module 428 may receive data indicating that a robotic system is incapable to classify the physical object according to at least one of a set of classifications, and/or incapable to manipulate the physical object in some way (e.g., according to a manipulation profile). In some embodiments, the data collection and analysis module 428 may then utilize the correlated data for each physical object as input to perform unsupervised learning (e.g., via the unsupervised ML module 432, described further below). In some embodiments, the data collected by this module may not include manually labeled ground truth labels of a particular class of the physical object.

The supervised machine learning training module 430 may comprise code that causes the processor 440 to perform one or more operations related to training a machine learning model via supervised machine learning that is utilizable for processing one or more physical objects. In some embodiments, the supervised machine learning training module 430 may utilize any suitable supervised machine learning process (e.g., algorithm) to train a machine learning model. This may include, but is not limited to, neural networks, decision trees, logistic regression models, etc. In an example involving training a neural network, this module 430 may receive a training data set as inputs. A training data sample may include, among other data, ground truth labels that may be used to train the neural network. In some embodiments, a ground truth label may be determined via manual input. In some embodiments, a ground truth label may be automatically generated based in part on a result of the unsupervised machine learning module 432, described below. In some embodiments, this module 430 may produce a trained machine learning model and/or manipulation profile that may be deployed to one or more robotic systems. For example, a manipulation profile may list how a particular physical object may be manipulated and a needed capability of a robot station to perform the manipulation. The particular manipulation profile utilized may depend, for example, on the robotic system using the trained machine learning model to classify the physical object (e.g., based on sensor data) and thereby select the particular manipulation profile. In some embodiments, the central computer system 406 may determine a local manipulation profile for a particular robotic system, based upon the known features (e.g., hardware capabilities) of the particular robotic system. In some embodiments, a global manipulation profile may be generated that is applicable to multiple robotic systems. Similarly, the trained machine learning model may be trained for one or more robotic systems. It should be understood that, this module 430 may be used to re-train an existing model to incorporate new training data, for example, determined in part based on output (e.g., ground truth labels determined from cluster data) from the unsupervised machine learning module 432. In this way, embodiments may enable machine learning modules to be more efficiently updated to handle processing new types of physical objects.

The unsupervised machine learning module 432 may comprise code that causes the processor 440 to perform one or more operations related to executing an unsupervised machine learning process to identify a class (e.g., a type) of physical objects associated with a common attribute. This module 432 may receive as input data associated with a plurality of physical objects. In some embodiments, the data associated with each physical object may be determined by the data collection and analysis module 428, as described herein. For example, the data may include one or more attributes of a physical object. The unsupervised machine learning module 432 may then determine one or more patterns among the data (e.g., attributes) for the plurality of physical objects. In some embodiments, these patterns (e.g., clusters) may be determined independent of manually curated ground truth labels. For example, the module 432 may determine a cluster of physical objects among the plurality of physical objects, whereby the cluster of physical objects is associated with a pattern that corresponds to having at least one common attribute with other physical objects of the cluster. In some embodiments, the plurality of physical objects may correspond to data collected for any suitable physical objects processed by the fulfillment center. In some embodiments, the plurality of physical objects may correspond to those physical objects that were determined to be associated with an inability to classify and/or manipulate the respective physical object in at least one aspect. In some embodiments, as described herein, physical objects may be included within a cluster by associating an object identifier of the respective physical object with a data structure/element(s) that represents the cluster. In some embodiments, a k-means clustering algorithm may be an example unsupervised machine learning process that is employed by this module 432. However, embodiments should not be construed to be so limited. Any suitable unsupervised machine learning methodology may be employed to identify common patterns between physical objects, including, but not limited to, neural networks (e.g., autoencoders), hierarchical clustering, anomaly detection, etc. In an example where k-means clustering is utilized, k may be chosen according to any suitable criteria. For example, multiple iterations of k may be performed, whereby a value of k is chosen such that an addition of another cluster does not produce significant information gain. Also, any suitable initialization method may be used. For example, the algorithm may randomly choose k observations from the dataset and use these as the initial means. As described herein, the unsupervised machine learning module 432 may thus determine, for a given cluster, one or more common attributes of the cluster that are common to physical objects of the cluster. For example, this may correspond to a new class of objects with a particular object identifier label type (e.g., a new barcode label), a new type of marking on the package, or a new type of package damage. These may be examples for which the trained machine learning model (e.g., described above, in reference to the supervised ML training module 430) has not yet previously been trained to detect/classify, etc. In some embodiments, this new class of physical object (and/or an associated common attribute) may be added to a block list, so that subsequent physical objects with this type of attribute are not routed to a robotic system that has not yet been trained to handle this type of physical object. In some embodiments, this new class of physical object may be used to auto-generate a ground truth label for a training data sample, which is thus used by the supervised ML training module 430 to retrain an ML model of a robotic system.

The block list management module 434 may comprise code that causes the processor 440 to perform one or more operations related to generating instructions for maintaining a list (e.g., a block list) associated with routing physical objects within a fulfillment center environment. For example, as described herein, the block list management module 434 may receive data indicating that one or more common attributes associated new physical object types will be added to the block list. In some embodiments, these common attributes may have been determined based on cluster data output from the unsupervised ML training module 432. The module 434 may then add the one or more common attributes (and/or new physical object class types) to the block list. It should be understood that any suitable types and/or numbers of lists may be created. Also, in some embodiments, this module 434 may be utilized to determine any suitable routing instructions for physical objects that are determined to match any one or more of the common attributes. For example, the module 434 may determine an instruction that physical objects that are determined to have a particular attribute (e.g., classification) should be routed (e.g., by the distribution computer system 102 of FIG. 1) to robotic system B 106 instead of robotic system A 104. In this example, the robotic system B 106 may be determined by the system to have a more up-to-date machine learning model that is trained to process this type of physical object. In another non-limiting example, the system may determine that the physical object should be routed to a manual station instead of a robotic system. In some embodiments, upon generating and/or updating a block list, the module 434 may transmit the block list to an upstream system (e.g., the distribution system 402) for routing subsequent physical objects. It should be understood that, based at least in part on the unsupervised learning and/or updates to the block list being able to be performed in near real-time, techniques described herein may significantly increase throughput of a fulfillment center (e.g., by diverting packages from being presented to a robotic system that is likely to be incapable of correctly classifying and/or manipulating the physical object).

Figure 5:
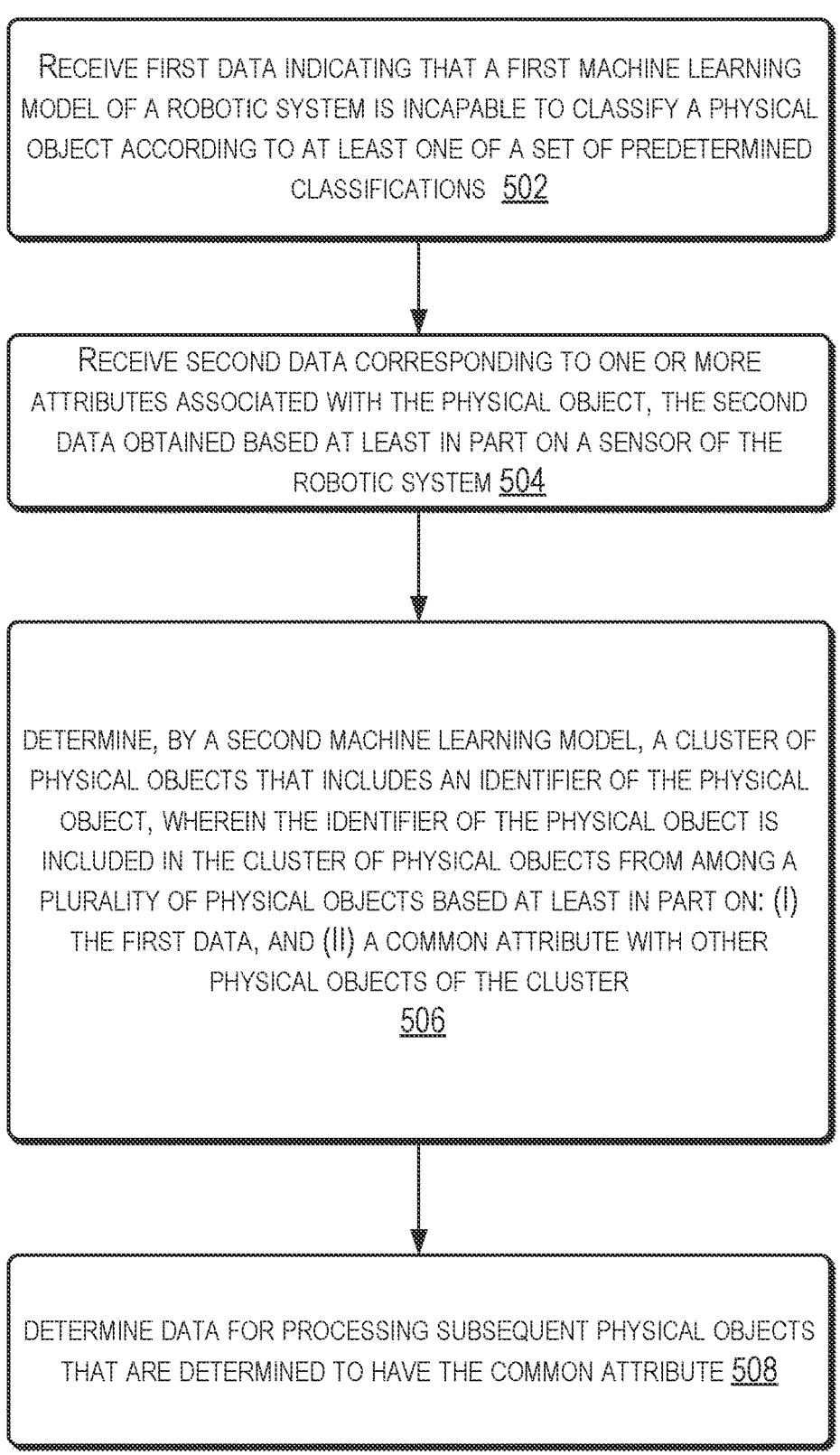
FIG. 5 is a simplified flow diagram illustrating an example process for determining data that is used to process future physical objects, according to some embodiments.

FIG. 5 is a simplified flow diagram illustrating an example process for determining feedback data that is used to process future physical objects that have a common attribute, according to some embodiments. Process 500 of FIG. 5 and process 600 of FIG. 6 (described below) are respectively illustrated as logical flow diagrams, each operation of which represents a sequence of operations that can be implemented in hardware, computer instructions, or a combination thereof. While process 500 and 600 are described as being performed by a central computer system, it should be understood that process 500 and/or process 600 may be performed by any suitable computer system described herein, including, but not limited to, a central computer system, a robotic system, or a distribution computer system.

In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

At block 502, a central computer system may receive first data indicating that a first machine learning model of a robotic system is unable to classify a physical object according to at least one of a set of predetermined classifications. For example, the first data may indicate that the first machine learning model is incapable to classify an object identifier label of the physical object as one of a predetermined set of object identifier label types (e.g., a barcode, a QR code, a serial number label, etc.). In some embodiments, an incapability to classify a physical object may be associated with an incapability of a robotic system (e.g., a robotic arm) to appropriately manipulate the physical object in some aspect. In some embodiments, the first data may also (and/or alternatively) be associated with a misclassification of a physical object.

At block 504, the central computer system may receive second data corresponding to one or more attributes associated with the physical object, the second data obtained based at least in part on a sensor of the robotic system. In some embodiments, the sensor may correspond to any of the sensors described herein, with respect to one or more robotic systems (e.g., see FIG. 2). The one or more attributes of the second data may correspond to any suitable information about the physical object, including, for example, data obtained from the sensor, such as image data. In some embodiments, the second data may be derived from the sensor (e.g., via the first machine learning model), such as attribute data determined via one or more classifications of the physical object. In some embodiments, the second data may be associated with a conveyance of the physical object to the robotic system from an upstream system (e.g., a distribution system), a conveyance of the physical object to a downstream system (e.g., a manual station), etc. In some embodiments, the central computer system may receive third data corresponding to a second set of attributes via a computing device at a manual station. In some embodiments, the central computer system may associate the one or more attributes of the second data with the second set of attributes based at least in part on at least one of: (I) a time window during which the physical object was received by the robotic system from a distribution system and transferred from the robotic system to the manual station, or (II) a unique identifier that is associated with the physical object and obtained by a sensor of the computing device.

At block 506, the central computer system may determine, by a second machine learning model, a cluster of physical objects that includes an identifier of the physical object. The identifier of the physical object may be included in the cluster of physical objects from among a plurality of physical objects based at least in part on: (I) the first data, and (II) a common attribute with other physical objects of the cluster. In some embodiments, operations of this block may be similar to as described with respect to, for example, the unsupervised ML module 432 of FIG. 4.

At block 508, the central computer system may determine data for processing subsequent physical objects that are determined to have the common attribute. In some embodiments, the data instructs a first computer system (e.g., the distribution computer system 102) to transport subsequent physical objects that are determined to have the common attribute along a different path from a particular fulfillment path to the robotic system. For example, the data may instruct the first computer system to transport subsequent physical objects with the common attribute directly to a manual station (e.g., manual station A 116). In some embodiments, the data may be used to generate first training data at least in part by updating second training data that was used to train the first machine learning model. In some embodiments, the first training data may be used to generate a third machine learning model that is a replacement for the first machine learning model on the robotic system. In some embodiments, the data may correspond to an instruction for processing containers that may contain one or more physical objects. For example, the instruction may indicate that, if a container is determined to have at least a predefined number of physical objects that have a common attribute, then the container should be routed to a manual station. In some embodiments, as described herein, the contents of a container may be obtained based on an object identifier of the container (e.g., and/or an associated manifest file) that is obtained based on an image classification algorithm of the first machine learning model.

Figure 6:
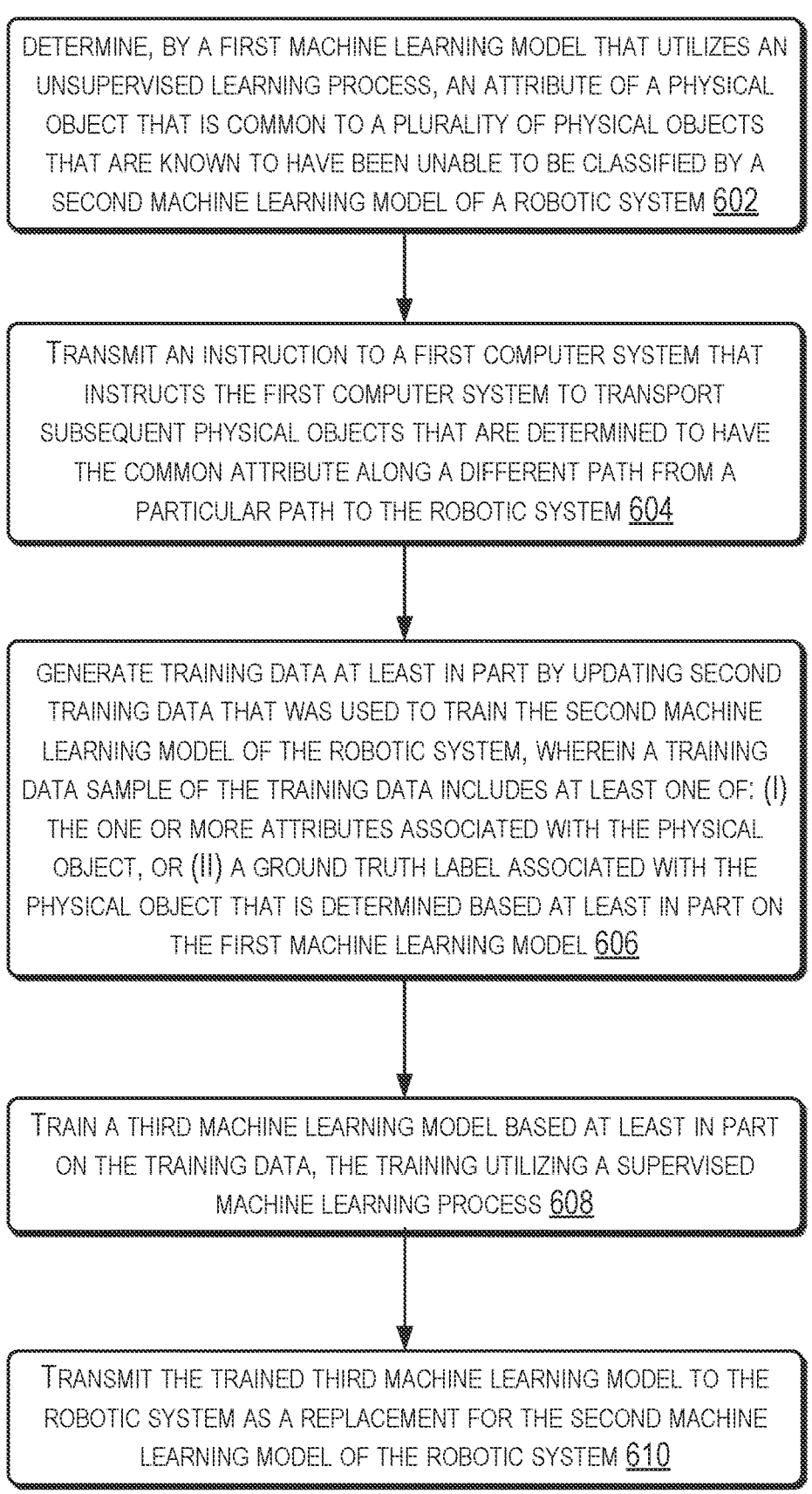
FIG. 6 is another simplified flow diagram illustrating an example process for utilizing data to process future physical objects, according to some embodiments.

FIG. 6 is another simplified flow diagram illustrating an example process for utilizing feedback data to process future physical objects, according to some embodiments.

At block 602, a central computer system may determine, by a first machine learning model that utilizes an unsupervised learning process, an attribute of a physical object that is common to a plurality of physical objects that are known to have been unable to be classified by a second machine learning model of a robotic system. In some embodiments, one or more operations of block 602 may be similar to as described with respect to, for example, the unsupervised ML module 432 of FIG. 4.

At block 604, the central computer system may transmit an instruction to a first computer system that instructs the first computer system to transport subsequent physical objects that are determined to have the common attribute along a different path from a particular path to the robotic system. For example, the first computer system may correspond to a distribution computer system that is upstream from the robotic system. The instruction may instruct the distribution computer system to transport subsequent physical objects to a manual station (or other robotic station) instead of the robotic system.

At block 606, the central computer system may generate training data at least in part by updating second training data that was used to train the second machine learning model of the robotic system. In some embodiments, a training data sample of the training data may include at least one of: (I) the one or more attributes associated with the physical object, or (II) a ground truth label associated with the physical object that is determined based at least in part on the first machine learning model. For example, an output (e.g., a common attribute) of the unsupervised ML process may be associated with a new type of physical object class (e.g., a ground truth label), upon which this new class may be associated with the one or more attributes of the training sample.

At block 608, the central computer system may train a third machine learning model based at least in part on the training data, whereby the training may utilize a supervised machine learning process. In some embodiments, one or more operations of block 608 may be similar to as described in reference to the unsupervised ML module 432 of FIG. 4. In some embodiments, the determination to train the third machine learning model may be based in part on a predefined number of physical objects with the common attribute (e.g. according to cluster data) that corresponds to a threshold value. This may be indicate to the system that there are enough problematic cases (e.g., issues with classification and/or manipulation of objects) to make it resource effective to update the second machine learning model with a new model.

At block 610, the central computer system may transmit the trained third machine learning model to the robotic system as a replacement for the second machine learning model of the robotic system. In some embodiments, transmitting the trained third machine learning model may also (and/or alternatively) involve transmitting updated classifiers, an updated manipulation profile and/or an updated multi-dimensional model to the robotic system, as described with respect to FIG. 2.

Figure 7:
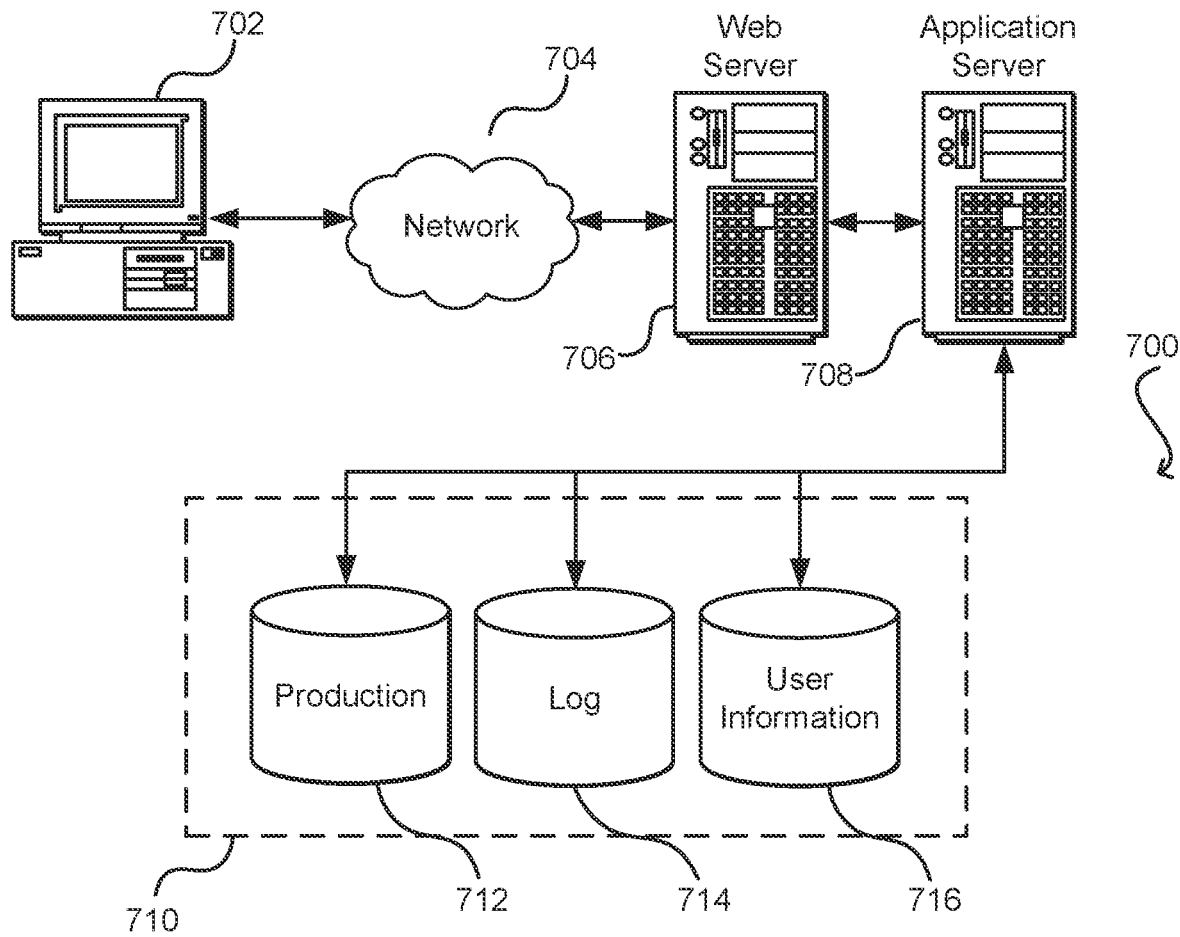
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OST"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C #, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An apparatus within a fulfillment center, comprising:
   a conveyor system, wherein the conveyor system is configured to transport physical objects along at least a first fulfillment path;
   a first computer system, wherein the first computer system manages distribution of physical objects along one or more fulfillment paths within the fulfillment center that includes the first fulfillment path and a second fulfillment path;
   a plurality of robotic systems, an individual a robotic system of the plurality of robotic systems comprising a robotic arm and being configured to receive the physical objects along the one or more fulfillment paths and manipulate the physical objects utilizing the robotic arm; and
   a central computer system, wherein the central computer system is configured to transmit instructions associated with distributing the physical objects to the first computer system or associated with manipulating the physical objects to the plurality of robotic system, and the central computer system comprising:
      a processor; and
      a memory storing instructions that, upon execution by the processor, cause the processor to:
         receive, from a first robotic system of the plurality of robotic systems, first data indicating that a first machine learning model of the first robotic system is incapable to classify a physical object according to at least one of a set of predetermined classifications, the physical object conveyed by the first computer system to the first robotic system via the conveyor system along the first fulfillment path and detected by a sensor of the first robotic system, the first data generated based at least in part on the first machine learning model generating a score that represents a level of confidence in a particular classification of the physical object and comparing the score to a particular threshold value;

instruct the first computer system to transport, via the conveyor system, the physical object along the second fulfilment path to a second robotic system of the plurality of robotic systems based at least in part on the first data indicating that the first machine learning model of the first robotic system is incapable of classifying the physical object;

receive, from the first robotic system, second data corresponding to one or more attributes associated with the physical object, the second data obtained based at least in part on the sensor of the first robotic system, the one or more attributes including a volume of the physical object, a structure of the physical object, and a fragility of the physical object;

determine, by a second machine learning model, a cluster of physical objects that includes an identifier of the physical object, wherein the identifier of the physical object is included in the cluster based at least in part on: (I) the first data, and (II) a common attribute with other physical objects of the cluster; and transmit data to the first computer system, wherein the data instructs the first computer system to transport subsequent physical objects that are determined to have the common attribute along the second fulfillment path from the first fulfillment path.

2. The apparatus of claim 1, wherein the first machine learning model is trained using a supervised machine learning process and the second machine learning model utilizes an unsupervised machine learning process that determines the cluster of physical objects from among a plurality of physical objects.

3. The apparatus of claim 1, wherein the sensor of the first robotic system includes at least one imaging device configured to capture an image of a portion of the physical object within a pick zone, and wherein the first machine learning model utilizes at least the image to classify the physical object.

4. The apparatus of claim 1, wherein a classification of the set of predetermined classifications corresponds to an indication of whether the first machine learning model successfully determined a characteristic of the physical object, the characteristic associated with processing physical objects via the robotic arm of the first robotic system.

5. A computer-implemented method, comprising:
receiving, by a computer system from a first robotic system, first data indicating that a first machine learning model of the first robotic system is incapable to classify a physical object according to at least one of a set of predetermined classifications, the physical object conveyed by the computer system to the first robotic system along a first path of one or more paths, the first data generated based at least in part on the first machine learning model generating a score that represents a level of confidence in a particular classification of the physical object and comparing the score to a particular threshold value;

instructing, by the computer system from the first robotic system, to transport the physical object along a second path of the one or more paths to a second robotic system of a plurality of robotic systems based at least in part on the first data indicating that the first machine learning model of the first robotic system is incapable of classifying the physical object:

receiving, by the computer system from the first robotic system, second data corresponding to one or more attributes associated with the physical object, the second data obtained based at least in part on a sensor of the first robotic system, the one or more attributes including a volume of the physical object, a structure of the physical object, and a fragility of the physical object;

determining, by a second machine learning model of the computer system, a cluster of physical objects that includes an identifier of the physical object, wherein the identifier of the physical object is included in the cluster based at least in part on: (I) the first data, and (II) a common attribute with other physical objects of the cluster;

determining, by the computer system, data for processing subsequent physical objects that are determined to have the common attribute; and instructing, by the computer system, the first robotic system and a robotic arm of the first robotic system to receive subsequent physical objects along the one or more paths that include the first path to the first robotic system, and manipulate the subsequent physical objects using the robotic arm to transport the subsequent physical objects that are determined to have the common attribute along the second path than the first path.

6. The computer-implemented method of claim 5, further comprising:
including, by the computer system, the common attribute among a plurality of attributes corresponding to a block list, the block list indicating that physical objects that are detected to have at least one attribute on the block list are to be routed to the second path; and transmitting, by the computer system, the block list to a first computer system, the first computer system including a sensor operable for detecting at least one attribute on the block list.

7. The computer-implemented method of claim 5, further comprising:
determining, by the computer system, that the second path corresponds to: (III) the second robotic system that is configured to process the physical object, the second robotic system and the first robotic system being included among a plurality of robotic systems of a fulfillment center, or (IV) a manual station.

8. The computer-implemented method of claim 5, further comprising:
receiving, by the computer system, third data from a computing device at a manual station, the third data corresponding to a second set of attributes associated with the physical object; and associating, by the computer system, the one or more attributes of the second data with the second set of attributes based at least in part on at least one of: (III) a time window during which the physical object was received by the first robotic system from a first computer system and transferred from the first robotic system to a manual station, or (IV) a unique identifier that is associated with the physical object and obtained by a sensor of the computing device.

9. The computer-implemented method of claim 8, further comprising:
determining, by the second machine learning model of the computer system, that the identifier of the physical object is to be included within the cluster of physical objects based at least in part on an association of the one or more attributes of the second data with the second set of attributes, wherein the second machine learning model utilizes an unsupervised machine learning process.

10. The computer-implemented method of claim 5, further comprising:
   training, by the computer system, the first machine learning model utilizing a supervised machine learning process based at least in part on training data, the training data including ground truth labels for respective physical objects, a ground truth label indicating a particular classification of a physical object; and
   transmitting, by the computer system, the first machine learning model to at least the first robotic system.

11. The computer-implemented method of claim 5, further comprising:
   generating, by the computer system, first training data at least in part by updating second training data that was used to train the first machine learning model of the first robotic system utilizing the data, wherein a training data sample of the first training data includes at least one of: (III) the one or more attributes associated with the physical object, wherein at least one attribute is associated with an image captured by the sensor of the first robotic system, or (IV) a ground truth label associated with the physical object that is determined based at least in part on determining the cluster of physical objects by the second machine learning model;
   training, by the computer system, a third machine learning model based at least in part on the first training data, the training utilizing a supervised machine learning process; and
   transmitting, by the computer system, the third machine learning model to the first robotic system as a replacement for the first machine learning model of the first robotic system.

12. The computer-implemented method of claim 5, further comprising:
   determining, by the computer system, that a number of physical objects included in the cluster of physical objects matches a threshold; and
   determining, by the computer system and based at least in part on the number of physical objects matching the threshold, to perform at least one of: (III) adding the common attribute to a block list that is used to redirect subsequent physical objects to the second path, or (IV) determining to retrain the first machine learning model.

13. The computer-implemented method of claim 5, further comprising:
   transmitting, by the computer system, the second data to a first computer system that is configured to manage distribution of physical objects along the one or more paths that include at least the first path to the first robotic system and the second path to the second robotic system, the second data instructing the first computer system to transport a container to a manual station instead of the first path to the first robotic system upon a determination that the container contains at least a predefined number of physical objects having the common attribute.

14. The computer-implemented method of claim 13, wherein the second data instructs the first computer system to transport the container to the manual station along a third path of the one or more paths.

15. A non-transitory computer readable medium storing specific computer-executable instructions that, when executed by a processor of a computer system, cause the computer system to:
   receive, from a first robotic system of a plurality of robotic systems, first data indicating that a first machine learning model of the first robotic system is incapable to classify a physical object according to at least one of a set of predetermined classifications, the physical object conveyed by a computer system to the first robotic system along a first path of one or more paths, the first data generated based at least in part on the first machine learning model generating a score that represents a level of confidence in a particular classification of the physical object and comparing the score to a particular threshold value;
   instruct the computer system to transport the physical object along a second path of the one or more paths to a second robotic system of the plurality of robotic systems based at least in part on the first data indicating that the first machine learning model of the first robotic system is incapable of classifying the physical object;
   receive, from the first robotic system, second data corresponding to one or more attributes associated with the physical object, the second data obtained based at least in part on a sensor of the first robotic system, the one or more attributes including a volume of the physical object, a structure of the physical object, and a fragility of the physical object;
   determine, by a second machine learning model, a cluster of physical objects that includes an identifier of the physical object, wherein the identifier of the physical object is included in the cluster based at least in part on: (I) the first data, and (II) a common attribute with other physical objects of the cluster;
   determine data for processing subsequent physical objects that are determined to have the common attribute;
   instruct the first robotic system and a robotic arm of the first robotic system to receive subsequent physical objects along the one or more paths that include the first path to the first robotic system, and manipulate the subsequent physical objects using the robotic arm to transport the subsequent physical objects that are determined to have the common attribute along the second path than the first path.

16. The non-transitory computer readable medium of claim 15, wherein the data is determined in real-time and corresponds to an instruction to add the common attribute to a block list, and wherein the block list is utilizable for determining to redirect the subsequent physical objects to the second path, from the first path, to the second robotic system.

17. The non-transitory computer readable medium of claim 15, wherein the second machine learning model determines the cluster of physical objects independent of ground truth labels associated with physical objects of a plurality of physical objects.

18. The non-transitory computer readable medium of claim 15, wherein an output of the second machine learning model corresponds to a ground truth label associated with a training sample, and wherein the ground truth label is utilizable as input to retrain the first machine learning model.

19. The non-transitory computer readable medium of claim 15, wherein the non-transitory computer readable medium further comprises additional computer-readable instructions that are executable by the processor to:

determine a predefined number of physical objects that corresponds to a threshold; and determine to retrain the first machine learning model based at least in part on a determination that a number of physical objects of the cluster of physical objects matches the predefined number of physical objects.

20. The non-transitory computer readable medium of claim 15, wherein classifications of set of predetermined classifications, respectively, include an indication whether at least one of (III) a size, (IV) a shape, (V) a reflectivity, (VI) a material type, (VII) a package type, (VIII) an object identifier, (IX) a color, (X) or a particular marking of the physical object is successfully classified by the first machine learning model.

* * * * *